US008483568B2

(12) United States Patent
Davidson et al.

(10) Patent No.: US 8,483,568 B2
(45) Date of Patent: Jul. 9, 2013

(54) DATA CENTER WITH FREE-SPACE OPTICAL COMMUNICATIONS

(75) Inventors: Howard Lee Davidson, San Carlos, CA (US); James R. Hamilton, Bellevue, WA (US); Roderick A. Hyde, Redmond, WA (US); Arne Josefsberg, Medina, WA (US); Edward K. Y. Jung, Bellevue, WA (US); Jordin T. Kare, Seattle, WA (US); Robert W. Lord, Seattle, WA (US); Kenneth Lustig, Redmond, WA (US); William Henry Mangione-Smith, Kirkland, WA (US); Michael Manos, North Bend, WA (US); Craig J. Mundie, Seattle, WA (US); Nathan P. Myhrvold, Medina, WA (US); Richard F. Rashid, Redmond, WA (US); Burton Smith, Seattle, WA (US); Clarence T. Tegreene, Bellevue, WA (US); Robert V. Welland, Seattle, WA (US); Charles Whitmer, North Bend, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 390 days.

(21) Appl. No.: 12/800,665

(22) Filed: May 19, 2010

(65) Prior Publication Data
US 2011/0286748 A1    Nov. 24, 2011

Related U.S. Application Data

(63) Continuation-in-part of application No. 12/655,067, filed on Dec. 21, 2009, now Pat. No. 8,301,028.

(51) Int. Cl.
*H04B 10/00* (2006.01)
(52) U.S. Cl.
USPC ............................. 398/124; 398/127; 398/130
(58) Field of Classification Search
USPC .................................................. 398/115–130
See application file for complete search history.

(56) References Cited

U.S. PATENT DOCUMENTS

| | | | |
|---|---|---|---|
| 5,786,923 A | 7/1998 | Doucet et al. | |
| 5,864,625 A | 1/1999 | Rutledge | |
| 5,963,351 A | 10/1999 | Kaplounenko et al. | |
| 6,348,986 B1 | 2/2002 | Doucet et al. | |
| 7,219,165 B1 * | 5/2007 | Gough | 709/250 |
| 7,330,661 B1 | 2/2008 | Jackson et al. | |
| 7,453,835 B1 * | 11/2008 | Coty et al. | 370/310 |
| 7,565,081 B1 | 7/2009 | Britz et al. | |
| 2002/0131123 A1 | 9/2002 | Clark | |
| 2002/0171898 A1 | 11/2002 | Patton | |

(Continued)

OTHER PUBLICATIONS

Araki, S. et al.; "Experimental Free-Space Optical Network for Massively Parallel Computers"; Applied Optics; dated Mar. 10, 1996; pp. 1269-1281; vol. 35, No. 8; Optical Society of America.

(Continued)

*Primary Examiner* — Dzung Tran

(57) ABSTRACT

A data center for executing a data processing application includes processing units, sub-units or servers. Each of the processing units, sub-units or servers can execute a part or all of the data processing application. The processing units, sub-units or servers are electrical disjoint with respect to data communications, but can communicate with each other over free space optical links.

51 Claims, 38 Drawing Sheets

U.S. PATENT DOCUMENTS

| | | |
|---|---|---|
| 2003/0128293 A1* | 7/2003 | Lundblad et al. .............. 348/445 |
| 2003/0182382 A1 | 9/2003 | Jordan, Jr. |
| 2004/0049524 A1 | 3/2004 | Toyota et al. |
| 2005/0207758 A1 | 9/2005 | Edwards et al. |
| 2006/0024061 A1 | 2/2006 | Wirth et al. |
| 2006/0195607 A1 | 8/2006 | Naseh et al. |
| 2007/0149184 A1* | 6/2007 | Viegers et al. .............. 455/422.1 |
| 2007/0171613 A1 | 7/2007 | McMahan et al. |
| 2007/0220170 A1 | 9/2007 | Abjanic et al. |
| 2007/0266107 A1* | 11/2007 | Friend et al. .................. 709/206 |
| 2007/0297808 A1 | 12/2007 | Pavelchek |
| 2008/0025722 A1 | 1/2008 | Gerstel |
| 2008/0044188 A1 | 2/2008 | Kagawa et al. |
| 2008/0275962 A1 | 11/2008 | Kobayashi et al. |
| 2008/0301279 A1 | 12/2008 | Brey et al. |
| 2009/0072967 A1* | 3/2009 | Campbell et al. ........ 340/539.13 |
| 2009/0202254 A1 | 8/2009 | Majumdar et al. |
| 2009/0307515 A1 | 12/2009 | Bandholz et al. |
| 2009/0310663 A1 | 12/2009 | Menon et al. |
| 2010/0012819 A1 | 1/2010 | Graham |
| 2010/0148093 A1 | 6/2010 | Benton |
| 2010/0310252 A1 | 12/2010 | Healey |
| 2011/0078290 A1 | 3/2011 | Calo et al. |
| 2011/0098076 A1* | 4/2011 | Kim et al. ..................... 455/522 |
| 2011/0116805 A1 | 5/2011 | Xia et al. |
| 2011/0166824 A1 | 7/2011 | Haisty et al. |
| 2011/0223952 A1* | 9/2011 | Nanda et al. .................. 455/509 |

OTHER PUBLICATIONS

Frietman, E. et al.; "Parallel Optical Interconnects: Implementation of Optoelectronics in Multiprocessor Architectures"; Applied Optics; dated Mar. 10. 1990; pp. 1161-1177; vol. 29, No. 8; Optical Society of America.

Natarajan, Srikanth et al.; "Bi-Directional Optical Backlane Bus for General Purpose Multi-Processor Board-to-Board Optoelectronic Interconnects"; Journal of Lightwave Technology; dated Jun. 1995; pp. 1031-1040; vol. 13, No. 6; IEEE.

PCT International Search Report; International App. No. PCT/US 10/03199; Mar. 14, 2011; pp. 1-2.

* cited by examiner

1910
Provide one or more data center bottles in the data center. Each data center bottle may have a plurality of data processing units (DPUs) configured to run a part or all of the data processing application. The plurality of DPUS may be linked to an optical interface unit which is configured to, under free space optical signal control, connect the data center bottle to an network of one or more free space optical communication links

---

1920
Provide an internal network of one or more free space optical communication links between a plurality of nodal points distributed across the data center.

2010
Provide one or more data center units (DCUs) in the data center. The DCUs may be configured to run a part or all of the data processing application. At least a first of the plurality of data center units has an optical interface unit (OIU) responsive to optical control signals

---

2020
Provide an internal network of one or more free space optical communication links between a plurality of nodal points distributed across the data center.

---

2030
Provide a network controller configured to connect or disconnect the plurality of data center units from the internal network

---
2110
Provide one or more data center units (DCUs) in the data center. The DCUs may be configured to run a part or all of the data processing application. At least one of the DCUs may be a mobile DCU movable between a first and a second location in the data center.

---
2120
Provide a reconfigurable internal network of one or more free space optical communication links between the plurality of DCUs.

---
2130
Provide an internal network controller configured to control inter-linking of one or more of the plurality of DCUs including the mobile DCU at its first and second locations to the reconfigurable internal network

---
2310
Provide one or more data center units (DCUs) in the data center. The DCUs may be configured to run a part or all of the data processing application and to be connected to other devices via a network of one or more free space optical communication links.

---
2320
Provide a modulator co-disposed with the first of the plurality of data center units. The modulator may configured to modulate a raw light beam and transmit a modulated light beam over the one or more free space optical communication links.

2410
Provide one or more data center units (DCUs) in the data center. The DCUs may be configured to run a part or all of the data processing application.

2420
Configure at least one of the plurality of DCUs to broadcast optical control and/or data signals in the region over an internal network of one or more free space optical communication links

2710
Provide a plurality of data center units (DCUs) in a data center. Each DCU may be configured to run a part or all of one or more data processing applications, and one of more of the DCUs may be coupled to an internal network of one or more free space optical communication links between the DCUs

2720
Configure the internal network to support multi-wavelength and/or multi-polarization optical communications over the links

3110
Provide a plurality of data center units (DCUs) disposed in the data center. Each DCU may be configured to run a part or all of a data processing application.

---

3120
Provide a power distribution system configured to distribute optical and/or wireless power to the plurality of data center units disposed in the region. At least a first of the plurality of data center units may be configured to run its part or all of the data processing application using optical and/or wireless power received via the power distribution system

3210
Provide a plurality of bottles in a data center, wherein each bottle has one or more data processing units (DPUs) configured to run a part or all of a data processing application.

---

3220
Provide at least a first of the plurality of bottles with an optical interface unit (OIU) configured to connect or disconnect the first bottle to or from an inter-bottle network of one or more free space optical communication links between the plurality of bottles

---

3230
Link the one or more data processing units (DPUs) in the first bottle communicatively by an intra-bottle network which is optically decoupled from the inter-bottle network

3310
Provide a data center unit (DCU) having one or more data processing units (DPUs) that are configured to run a part or all of a data processing application

3320
Provide an optical interface unit (OIU) coupled to the one or more DPUs. The OIU may be configured to couple the DCU to a network of one or more free space optical communication links. Further, the OIU may include one or more independently steerable light transmitting elements, independently steerable light redirecting elements, and/or independently steerable light receiving elements for communications over the free space optical communication links.

3410
Provide a plurality of data center units (DCUs) disposed in a data center. Each DCU may be configured to run a part or all of a data processing application.

---

3420
Provide an optical interface unit (OIU) coupled to the one or more DPUs. The OIU may be configured to couple the DCU to a network of one or more free space optical communication links. Further, the OIU may include one or more independently steerable light transmitting elements, independently steerable light redirecting elements, and/or independently steerable light receiving elements for communications over the free space optical communication links.

---

3430
Steer the independently steerable elements of the OIU to establish free space optical communication links

---
3510
Provide a data center unit (DCU) having one or more data processing units (DPUs) that are configured to run a part or all of a data processing application ---
3520
Provide an optical interface unit (OIU) coupled to the one or more DPUs. The OIU may be configured to couple the DCU to a network of one or more free space optical communication links. Further, the OIU may include one or more independently steerable light transmitting elements, independently steerable light redirecting elements, and/or independently steerable light receiving elements for communications over the free space optical communication links.

3610
Provide a plurality of data center units (DCUs) disposed in a data center. Each DCU may be configured to run a part or all of a data processing application.

---

3620
Provide an optical interface unit (OIU) coupled to the one or more DCUs (3620). The OIU may be configured to couple the DCU to an internal network of one or more free space optical communication links. Further, the OIU may include one or more electrooptically steerable elements for transmitting, redirecting, and/or receiving communications over the free space optical communication links.

---

3630
Steer the electrooptically steerable elements for transmitting, redirecting, and/ or receiving communications over the free space optical communication links

3710
Provide a plurality of data center units (DCUs) disposed in a data center. Each DCU may be configured to run a part or all of a data processing application.

---

3720
Predict a communication need between a first DCU and a second DCU running part or all of the data processing application.

---

3730
Steer the electrooptically steerable elements for transmitting, redirecting, and/or receiving communications over the free space optical communication links.

DATA CENTER WITH FREE-SPACE OPTICAL COMMUNICATIONS

RELATED APPLICATIONS

For purposes of the USPTO extra-statutory requirements, the present application constitutes a continuation-in-part of U.S. patent application Ser. No. 12/655,067, entitled DATA CENTER WITH FREE-SPACE OPTICAL COMMUNICATIONS, naming Howard L. Davidson, James R. Hamilton, Roderick A. Hyde, Arne Josefsberg, Edward K. Y. Jung, Jordin T. Kare, Robert W. Lord, Kenneth Lustig, William Henry Mangione-Smith, Michael Manos, Craig J. Mundie, Nathan P. Myhrvold, Richard F. Rashid, Burton Smith, Clarence T. Tegreene, Robert V. Welland, Charles Whitmer and Lowell L. Wood, Jr. as inventors, filed 21 Dec. 2009 now U.S. Pat. No. 8,301,028, which is currently co-pending, or is an application of which a currently co-pending application is entitled to the benefit of the filing date.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

TECHNICAL FIELD

The present application relates, in general, to data centers, which are facilities used to house computer systems and associated components, such as telecommunications and storage systems. In particular, the application relates to data and signal communications in a data center.

BACKGROUND

A data center or computer room (also called a server farm) is a facility or room used to house computer systems and associated components for companies and organizations. The facility usually includes environmental controls (air conditioning, fire suppression, etc.), redundant/backup power supplies, and redundant data communications connections. Some modern data centers may contain tens of thousands of computers or servers. Many cables are necessary to connect all the components and methods to accommodate and organize these have been devised, such as standard racks to mount equipment, elevated floors, and cable trays (installed overhead or under the elevated floor).

Modern data centers may conform to industry design standards (e.g., the TIA-942 Telecommunications Infrastructure Standards for Data Centers). The TIA-942 infrastructure standards set forth, for example, design considerations for site space and layout and cabling infrastructure for data centers. However, even in data centers designed to standards, cabling requirements impose severe constraints the type and number of components that can be deployed in a give space, and on their serviceability.

Consideration is now being given to data center infrastructure. In particular attention is directed to processing components, communications links and network architecture in the data center.

SUMMARY

Data center devices, environments, and methods for executing a data processing application are provided.

A data center for executing a data processing application includes processing units, sub-units or servers. Each of the processing units, sub-units or servers can execute a part or all of the data processing application. In the data center, the processing units, sub-units or servers are electrical disjoint with respect to data communications, but can communicate with each other over optical links or interconnections.

The processing units, sub-units or servers may, for example, be arranged in groups, clusters, or "bottles." An exemplary data center bottle includes a plurality of data processing units (DPUs) coupled to an optical interface unit (OIU). The data center bottle is configured to be deployed in a data center having an internal network of one or more free space optical communication links between a plurality of nodal points distributed across the data center. The OIU is configured to connect or disconnect the data center bottle to or from the internal network of one or more free space optical communication links.

An exemplary data center utilizes a free-space optical communication links network, which may be reconfigurable, for data and/or control signal communications between data center components or units. The free-space optical communication may provide support dynamically assigned point-to-point virtual circuits. Further, the free-space optical communication links can provide flexibility in packing, serviceability, replacement and/or upgrading of components of the data center.

An exemplary data center bottle includes a plurality of data processing units (DPUs) coupled to an optical interface unit (OIU). Each of the DPUs is configured to run a part or all of a data processing application. The data center bottle is configured to be deployed in a data center having an internal network of one or more free space optical communication links between a plurality of nodal points distributed across the data center, and the OIU is configured to connect or disconnect the data center bottle to or from the internal network of one or more free space optical communication links.

A further exemplary data center includes a plurality of data center units (DCUs) disposed in a region. Each DCU is configured to run a part or all of a data processing application. At least a first of the plurality of data center units has an optical interface unit (OIU) responsive to optical control signals. The data center further includes an internal network of one or more free space optical control and/or data communication links between nodal points associated with individual DCUs across the data center, and a network controller configured to connect or disconnect the plurality of data center units from the internal network.

In general, the plurality of data center units may include one or more of data center bottles and/or data processing units. The data center bottles may include one or more data processing units, which may include one or more data processing circuits (e.g., electronic modules, boxes, servers, cards, boards, and/or racks or free standing assemblies thereof). A data center unit may include an internal power grid configured to distribute power to the one or more of data center bottles, data processing units and/or data processing circuits therein.

A still further exemplary data center includes a plurality of data center units (DCUs) disposed in a region. Each DCU is configured to run a part or all of a data processing application. At least one of the DCUs is a mobile DCU movable between a first and a second location in the region. The mobile DCU may include a location device (e.g., a location reporter, a beacon, a tracking unit, and a corner cube, etc.). The data center may include a tracking device configured to determine a position of the mobile DCU (e.g., an intra-data-center positioning system, a theodolite, a total station transit device, electronic distance measuring device or galvanometer, grids, floor markings, a bar code and/or fiducial readers, etc.). The data center further includes reconfigurable internal network of one or more free space optical communication links inter-linking of one or more of the plurality of DCU, and a network controller configured to control inter-linking of one or more of the plurality of DCUs including the mobile DCU at its first and second locations to the reconfigurable internal network.

Another exemplary data center includes a plurality of data center units (DCUs) disposed in a region. Each DCU is configured to run a part or all of a data processing application. The data center further includes an internal network of one or more free space optical communication links to at least a first of the plurality of data center units, a modulator co-disposed with the first of the plurality of data center units in the region, and at least one light beam source disposed external to the first of the plurality of data center units and configured to provide a raw light beam to the modulator. The modulator is configured to modulate the raw light beam and transmit a modulated light beam over the one or more free space optical communication links.

An exemplary data center unit (DCU) includes one or more data processing units that are configured to run a part or all of a data processing application, and a modulator coupled to the one or more data processing units. The DCU is configured to be connected to other devices via a network of one or more free space optical communication links, and the modulator is configured to modulate a raw light beam received from a source external to the DCU and to transmit a modulated light beam over the one or more free space optical communication links.

A still another exemplary data center includes a plurality of data center units (DCUs) disposed in a region. Each DCU is configured to run a part or all of a data processing application, and at least one of the DCUs is configured to broadcast optical control and/or data signals in the region over an internal network of one or more free space optical communication links.

A yet another exemplary data center includes a plurality of data center units (DCUs) disposed in a region. Each DCU is configured to run a part or all of a data processing application, and at least one DCU includes an optical receiver having a receiving position. The optical receiver in its receiving position is configured to receive multiple optical control and/or data signals over a one or more free space optical communication links leading to the at least one DCU.

Another exemplary data center unit (DCU) includes one or more data one or more data processing units that are configured to run a part or all of a data processing application, and a transmitter and/or a receiver coupled to the one or more data processing units. The transmitter is configured to broadcast optical data signals over a plurality of optical communication links extending from the DCU, and the receiver is configured to receive multiple optical control and/or data signals over one or more free space optical communication links leading to the DCU.

An additional exemplary data center includes a plurality of data center units (DCUs). Each DCU is configured to run a part or all of one or more data processing applications. One of more of the DCUs are coupled to an internal network of one or more free space optical communication links between the DCUs, and the internal network is configured to support multi-wavelength and/or multi-polarization optical communications over the links.

A yet another exemplary data center unit (DCU) includes one or more data processing units that are configured to run a part or all of a data processing application, and an optical interface unit (OIU) configured to couple the DCU unit to a network of one or more free space optical communication links. The network may be configured to support multi-wavelength and/or multi-polarization optical communications over the one or more links.

A different exemplary data center includes a first set of data center units (DCUs), and a second set of DCUs coupled to the first set of DCUs via an internal network of one or more optical communication links. Each DCU is configured to run a part or all of a data processing application. The internal network includes at least a first network hub and a second network hub, and the first and second set of DCUs are linked to the first and second network hubs, respectively, via one or more free space optical communication links.

Another exemplary data center bottle includes a data processing unit having a wired, an optical, a wireless, and/or a microwave power receiver. The data processing unit may, for example, be configured to run a part or all of a data processing application using, for example, optical and/or wireless power received by the power receiver. A yet different exemplary data center includes a plurality of data center units (DCUs) disposed in a region. Each DCU is configured to run a part or all of a data processing application. Each DCU may include an internal power grid configured to distribute power to the one or more of data center bottles, data processing units and/or data processing circuits in the DCU.

The data center further includes a power distribution system configured to distribute optical and/or wireless power to the plurality of data center units disposed in the region. At least a first of the plurality of data center units is configured to run its part or all of the data processing application using optical and/or wireless power received via the power distribution system.

A still different exemplary data center includes a plurality of bottles. Each bottle has one or more data processing units (DPUs) configured to run a part or all of a data processing application. At least a first of the plurality of bottles has an optical interface unit (OIU) configured to connect or disconnect the first bottle to or from an inter-bottle network of one or more free space optical communication links between the plurality of bottles in the data center. The one or more data processing units (DPUs) in the first bottle are communicatively linked by an intra-bottle network which is optically decoupled from the inter-bottle network.

A still another exemplary data center unit (DCU) includes one or more data processing units (DPUs) that are configured to run a part or all of a data processing application, and an optical interface unit (OIU) coupled to the one or more DPUs. The OIU is configured to couple the DCU to a network of one or more free space optical communication links. For this purpose, the OIU includes one or more independently steerable light transmitting elements, independently steerable light redirecting elements, and/or independently steerable light receiving elements.

A further different exemplary data center unit (DCU) includes one or more data processing units (DPUs) that are configured to run a part or all of a data processing application, and an optical interface unit (OIU) coupled to the one or more DPUs. The OIU is configured to couple the DCU to a network of one or more free space optical communication links. The OIU includes one or more electrooptically steerable elements for transmitting, redirecting, and/or receiving communications over the free space optical communication links.

A different data center includes a plurality of data center units (DCUs) disposed in a region. Each DCU is configured to run a part or all of a data processing application. At least a first of the plurality of data center units has an optical interface unit (OIU), which is configured to couple the DCU to an internal network of one or more free space optical communication links. The OIU may include one or more independently steerable transmitting elements, independently steerable redirecting elements, and/or independently steerable receiving elements for communications over the free space optical communication links. The OIU may, alternatively or additionally, include one or more electrooptically steerable elements for transmitting, redirecting, and/or receiving communications over the free space optical communication links.

Methods for executing a data processing application involve providing data center environments and data center components (e.g., bottles, units or processing units or circuitry) including stationary or mobile components, for processing a part or all of the data processing application. The data center components may include one or more of electronic modules, boxes, servers, cards, boards, and/or racks or free standing assemblies thereof. The methods can include further providing other data center components (e.g., a cooling unit, a wireless and/or optical power receiver, a power storage unit and/or a beacon or other device configured to indicate a location of a data center component, an external access interface/controller, optical interface unit/network controller, a router, etc.).

The methods also provide or involve internal networks of optical links for communications between various data center bottles, units, or other components in a data center. The internal networks can involve free space optical communication links between a plurality of nodal points distributed across the data center.

The foregoing summary is illustrative only and is not intended to be limiting. In addition to the illustrative aspects, embodiments, and features described above, further aspects, embodiments, and features of the solutions will become apparent by reference to the drawings and the following detailed description.

BRIEF DESCRIPTION OF THE FIGURES

In the accompanying drawings:

FIGS. 19-37 are flow diagrams illustrating exemplary methods for executing a data processing application in a data center or server farm, in accordance with the principles of the solutions described herein.

Throughout the figures, unless otherwise stated, the same reference numerals and characters are used to denote like features, elements, components, or portions of the illustrated embodiments.

DETAILED DESCRIPTION

Figure 1:
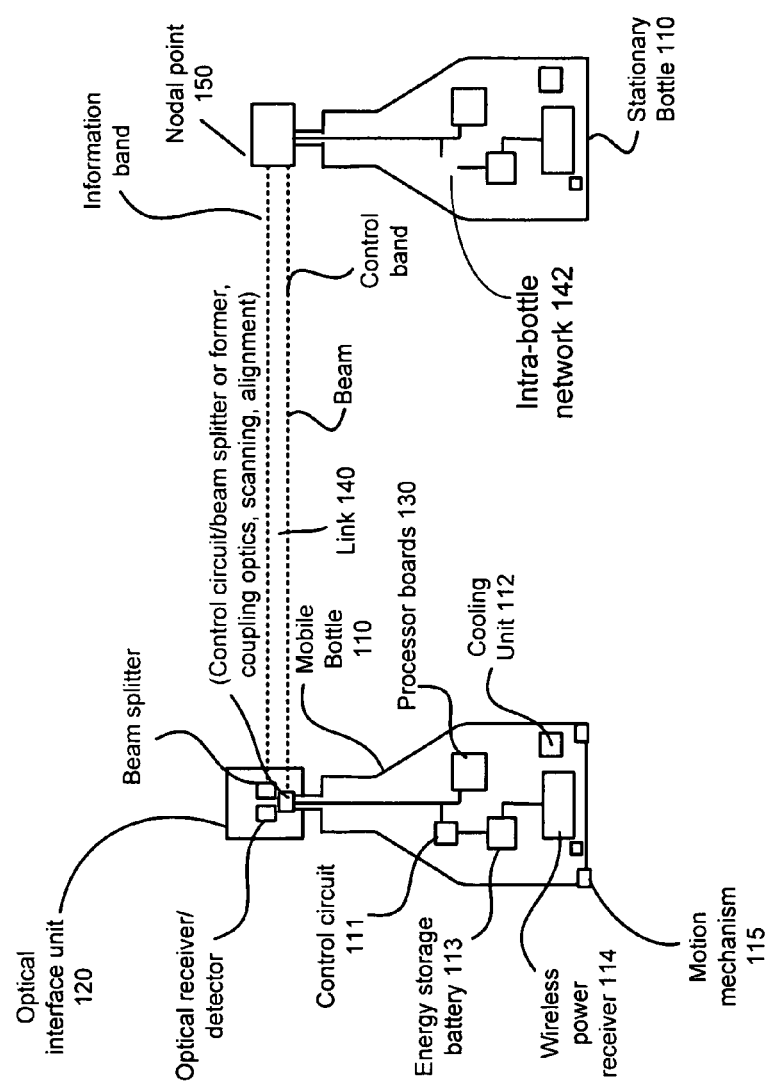
FIG. 1 is a block diagram illustrating an exemplary data center container or bottle coupled to an optical communications interface unit, in accordance with the principles of the solutions described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

An exemplary data center utilizes free-space optical communication links network, which may be reconfigurable, for data and/or control signal communications between data center components or units. The free-space optical communication may provide support dynamically assigned point-to-point virtual circuits. Further, the free-space optical communication links can provide flexibility in packing, serviceability, replacement and/or upgrading of components of the data center.

The processing units, sub-units or servers may, for example, be arranged in groups, clusters, or "bottles." An exemplary data center bottle includes a plurality of data processing units (DPUs) coupled to an optical interface unit (OIU). The data center bottle is configured to be deployed in a data center having an internal network of one or more free space optical communication links between a plurality of nodal points distributed across the data center. The OIU is configured to connect or disconnect the data center bottle to or from the internal network of one or more free space optical communication links.

FIG. 1 shows an exemplary data center container or bottle 110 coupled to an optical communications interface unit (OIU) 120. Data center bottle 110 includes a plurality of data processing units (DPUs) 130. The DPUs may be servers, computers, electronic modules, boxes, servers, cards, boards, racks and/or other processing circuitry. Each DPU 130 may be configured to run or process a part or all of a data processing application. Data center bottle 110 may be configured to be deployed in a data center having an internal network of one or more free space optical communication links (e.g., links 140) between a plurality of nodal points 150 distributed across the data center. Data center bottle 110 may include control circuitry configured to supervise operations of the OIU 120 and/or other data processing unit components (e.g., cooling unit 112, energy storage battery 113, wireless power receiver 114, and motion mechanism 115).

Data center bottle 110 may include an intra-bottle communications network 142 of data and/or control signal links interconnecting DPUs 130 in the bottle. The intra-bottle communications network may utilize one or more of wires, conductors, transmission lines, optical fibers, electromagnetic waveguides, free space optical and/or free space electromagnetic wave links for data and/or control signals between the DPUs. Further, OIU 120 may be configured to connect the intra-bottle communications network 142 to the internal network of one or more free space optical communication links.

OIU 120 may include suitable optical devices (e.g., a light beam transmitter, pass-through device, and/or a receiver, a beam splitter or beam former, an optical beam generator, a beam-forming circuitry, an optical signal receiver/detector, an optical beam modulator, an optical beam director, a steerable optical element, an electrical-to-optical signal convertor, an optical-to-electrical signal converter, electrical and/or optical switchgear, coupling optics, etc.) to send and/or receive data or other optical signals over links 140. OIU 120 may also include suitable scanning and alignment mechanisms and control circuitry for the various electro-mechanical or electro-optical devices therein. Further, OIU 120 may be configured to connect or disconnect the data center bottle to or from the internal network of one or more free space optical communication links 140, for example, under free space optical signal control. For this purpose, OIU 120 may include any suitable arrangement (e.g., opto-mechanical and/or opto-electric transducers) responsive to optical signal control to connect or disconnect the data processing bottle to or from the internal network. The free space optical control signal may, for example, be transmitted over a control portion of internal network link 140 or other link (e.g., directly) from a controller.

Data center bottle 110 may be free-standing, i.e. operable without being physically connected to external power or utility sources. Data center bottle 110 may have optional internal power and utility sources, which allow bottle 110 to operate independently of fixed or wired utility or power connections. For example, data center bottle 110 may optionally include one or more of an internal cooling unit 112, an energy storage battery 113, and a wireless and/or optical power receiver 114. Cooling unit 112, which may utilize refrigerants, cryogens, and/or air or liquid coolants, may be configured to cool one or more data center components. Energy storage battery 113, which may be a rechargeable battery, may be configured to supply power to one or more data center components for their operation. Like wise, wireless and/or optical power receiver 114 may be configured receive "cable free" power for the operation of bottle 110 components.

Data center bottle 110 may further include a motion mechanism 115 (e.g., a set of motorized wheels) that allows data center bottle 110 to move, for example, from one location to another location in a data center. Data center bottle 110 may be configured to operate (i.e. process data) even while in motion. Data center bottle 110 may include a location-indicating beacon which indicates a location and/or orientation of the data center bottle. The beacon may be a part of OIU 120 or be a separate unit.

Figure 2:
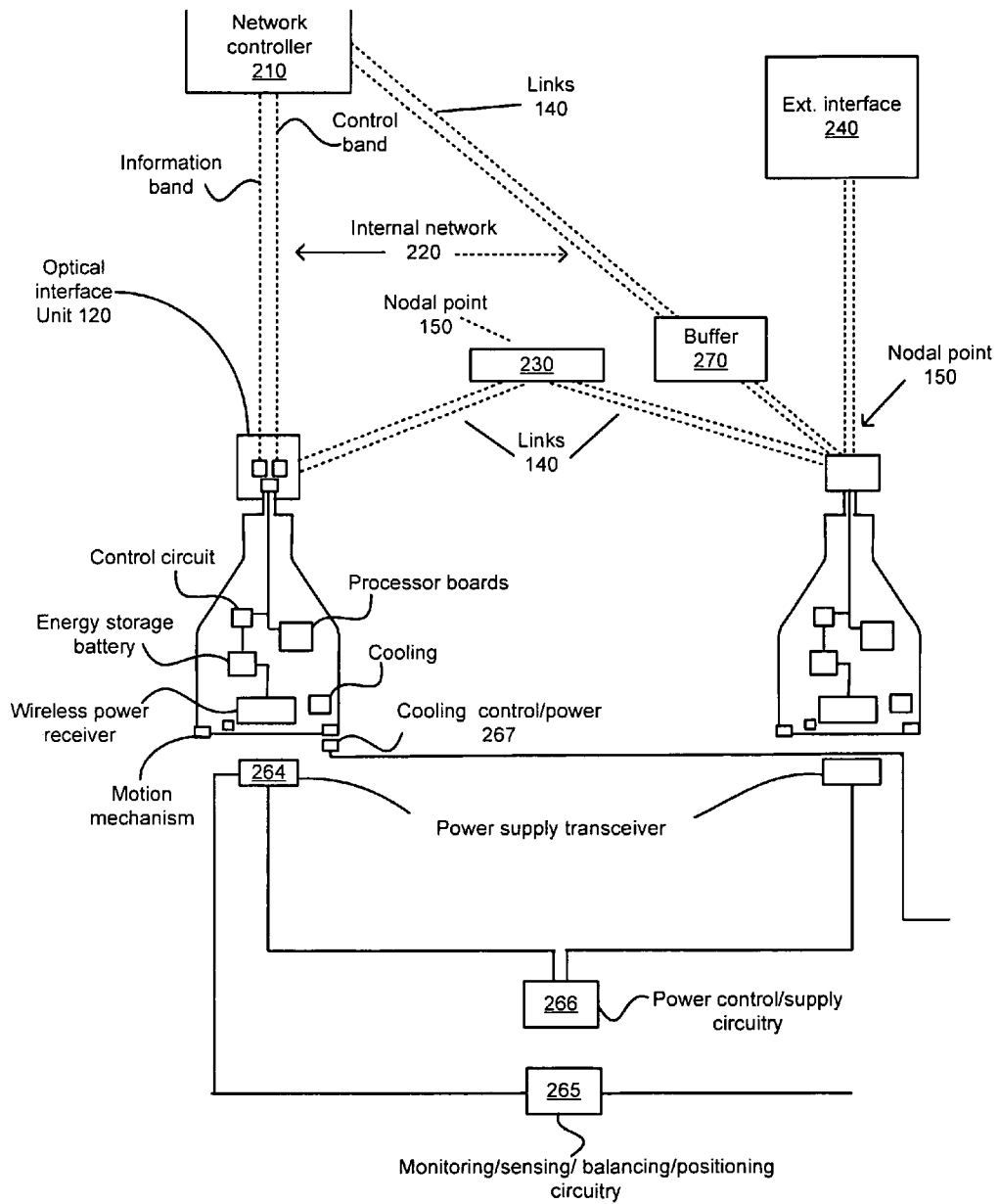
FIG. 2 is a block diagram illustrating an exemplary data center deploying a plurality of data center container or bottle that are linked by an internal network of free space optical communication links, in accordance with the principles of the solutions described herein.

FIGS. 2-5 show an exemplary data center 200 in which a plurality of data center units (DCUs) disposed in a space or region. With reference to FIG. 2, each DCU may include one or more of data center bottles, data processing units, data processing circuits, electronic modules, boxes, servers, cards, boards, and/or racks or free standing assemblies thereof. The DCUs may, for example, include one or more data center bottles 110. Each DCU in data center 200 may configured to run a part or all of a data processing application. Further, at least a first of the plurality of data center units may have an optical interface unit (e.g., OIU 120) responsive to optical control signals. The optical interface unit may include one or more of an optical beam generator, a beam-forming circuitry, an optical signal receiver, an optical signal pass-through device and/or an optical-to-electrical signal converter. One or more of the DCUs in data center 200 may include an optional wireless, microwave and/or optical power receiver and/or a cooling unit. Further, one or more of the DCUs in data center 200 may be mobile DCUs, which can be moved from one location to another location in data center 200. The mobile DCU may include a location device (e.g., a location reporter, a beacon, a tracking unit, and a corner cube, etc.). The data center may include a tracking device configured to determine a position of the mobile DCU (e.g., an intra-data-center positioning system, a theodolite, a total station transit device, electronic distance measuring device or galvanometer, grids, floor markings, a bar code and/or fiducial readers, etc.).

Data center 200 may include monitoring/sensing and/or balancing mechanisms 265 (e.g., tracks, runners, guides, sensors, location-indicators, bar code or identification readers, power sources, locking mechanisms, etc.) to facilitate movement of mobile DCUs from one location to another location in data center 200. One or both of the locations may be "service" locations at which the mobile DCU is supplied with, for example, power, coolants and/or other utilities. For this purpose, data center 200 may include, for example, power control and supply circuitry 266. Power control and supply circuitry may include, for example, one or more suitable power supply transceivers 264 disposed at suitable locations in data center to dispense power to mobile DCUs. An exemplary power supply transceiver 264 may, for example, deliver power to storage battery 113 via a physical contact connection. Power supply transceiver 264 may, alternatively or additionally deliver power to wireless power receiver 114 via inductive coupling. Data center 1500 may also include a cooling control/power mechanism 267 coupled to one or more of the DCUs to supply coolants and/or power to cooling unit 112 in a DCU.

The plurality of DCUs in data center 200 may be electrically disjoint for data communications. The plurality of DCUs processing or running parts of the data processing application may be in communication with each other only optically (or wirelessly). Data center 200 includes an internal network 220 of one or more free space optical control and/or data communication links (140) between nodal points (150) across the data center. Internal network 220 may include an optical arrangement configured to redirect light from a first nodal point 150 to a second nodal point 150. The optical arrangement may include an arrangement of discrete mirrors, diffractive elements, and/or reflectors configured to redirect light from a first nodal point to a second nodal point in the internal network. Each link 140 in internal network 220 may include separate or common information and control signal bands.

Data center 200 further includes a network controller 210, which configured to connect or disconnect the plurality of data center units from the internal network. Network controller 210 may be configured to control the optical interface units of the DCUs using optical, electrical and/or electromagnetic signals. For example, network controller 210 may be configured to control the optical interface units of the DCUs with free space optical control signals. The free space optical control signals may propagate, for example, on a control band of a link 140 to an OIU 120. Further, network controller 210 may be configured to reposition a mobile DCU in data center 200 to establish the one or more free space optical communication links 140 in internal network 220. Network controller 210 may reposition the mobile DCU, for example, in response to a data center application demand, a data center process value and/or an external process value or command.

One or more nodal points 150 in internal network 220 may be associated with individual DCUs in data center 200. At least one nodal point 150 may correspond to the first of the plurality of data center units' OIU. Further, at least one nodal point 150 may be external to the plurality of data center units in data center 200. For example, a nodal point 150 may be associated with network controller 210. Another nodal point 150 may be associated with an external network access interface 240, which provides external network access to data center data center 200. Further, for example, nodal points 150 may be associated with passive or active optical structures 230 disposed on walls or between DCUs in data center 200. Each nodal point 150 in internal network 220 may include passive or active optical structures or elements that are configurable to establish the one or more free space optical communication links 140. The optical structures or elements may, for example, include one or more of a reflecting mirror, a steerable telescope, a hemispherical lens, an optical router, an optical-optical switch, an opto-electronic switch, electronic switch an optical beam generator, an optical signal modulator, an optical frequency convertor, an electric-to optical convertor, an optical-to-electric convertor, an electro-optical beam steering element, an acoustic-optical beam steering element, a diffractive beam steering element, and/or a mechanically steerable optical element.

Figure 5:
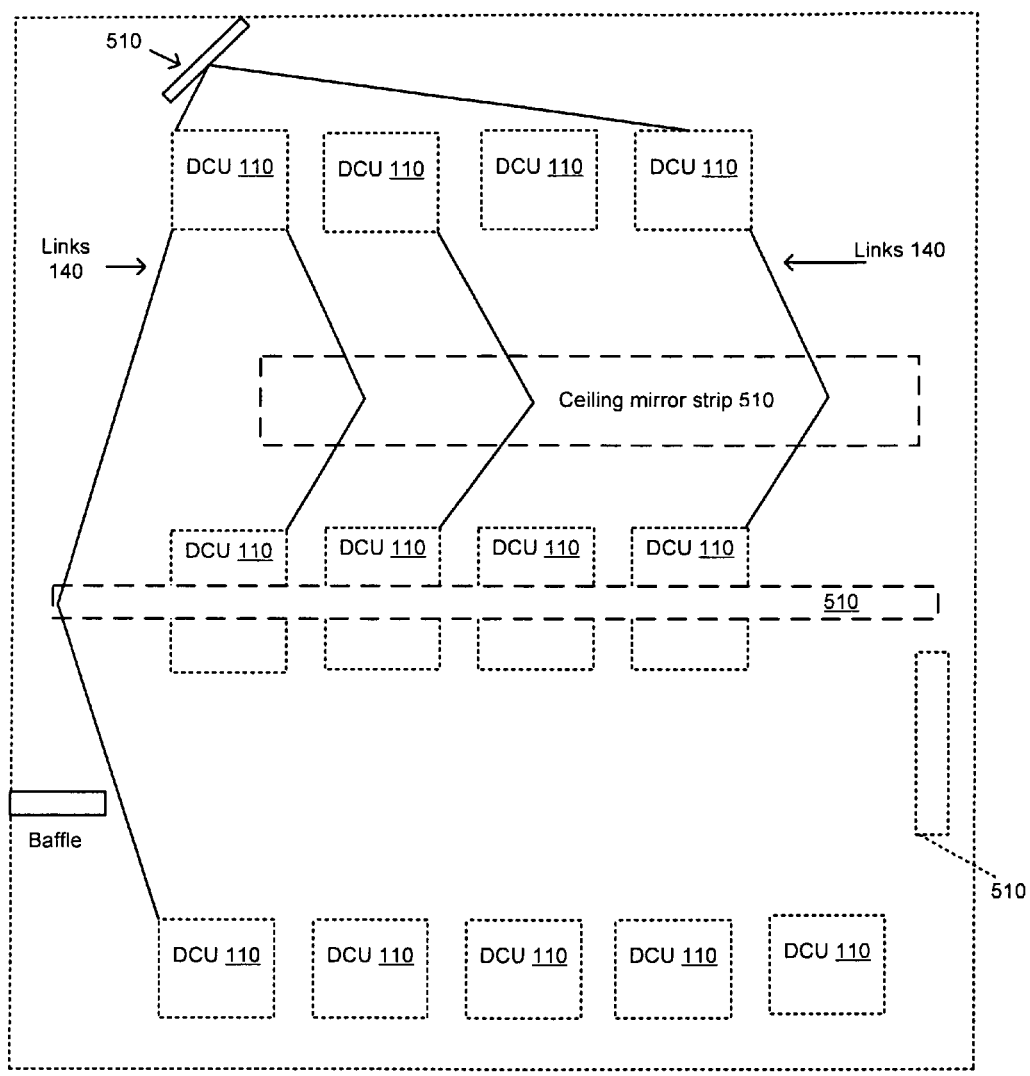

In general, one or more nodal points 150, which may be interposed at locations remote to DCUs 110, may include a reconfigurable nodal point. Like OIU 120, the reconfigurable nodal point may include a passive or an active optical arrangement 510 of one or more optical elements (e.g., a mirror, a steerable mirror, a modulator, a switch, a receiver, a transmitter, and/or a receiver-transmitter) (FIG. 5). The optical elements (e.g., a fixed or steerable mirror disposed at any one of a data center region wall, ceiling, floor, and/or boundary) may be configured to redirect an optical beam incident from a first nodal point 150 in the network 220 to one or more other nodal points 150. The optical elements may include an arrangement of discrete mirrors and/or reflectors configured to redirect light from a first nodal point to a second nodal point in the internal network. The discrete mirrors and/or reflectors may be optically steerable.

With reference to FIG. 5, in an exemplary data center 200, where the plurality of DCUs are disposed in a multiplicity of rows, optical arrangement 510 may include one or more mirror strips disposed about parallel to a first of the multiplicity of rows of the DCUs. The mirror strips may be disposed over the multiplicity of rows. A mirror strip disposed over a first row may, for example, be configured to redirect light from a first nodal point to a second nodal point in the same row. Further, for example, a mirror strip over a first row may be configured to redirect light from a first nodal point in the first row to a second nodal point in a second row that is separated from the first row by an odd number of rows. Alternatively or additionally, optical arrangement 510 may include a mirror strip over an open space adjacent to a first row configured to redirect light from a first nodal point in the first row to a second nodal point in a second row that is separated from the first row by an even number of rows. Optical arrangement 510 may include mirror strips may be disposed at a substantial angle [e.g., of about 45 degrees] to a first of the plurality of rows of the DCUs and configured to redirect light from a first nodal point in a first row to a second nodal point at about the end of the first row. Optical arrangement 510 may further include structures, blockers, screens and/or baffles to block stray light. An optical arrangement 510 may itself form a nodal point 150 of first nodal point 150 in the network 220.

In an implementation of data center 200, internal network 220 may include one or more free space optical control and/or data communication links 140 between N nodal points (A, B, C . . . ) across the data center region. The N nodal points may include one or more nodal points corresponding to individual DCUs connected to the internal network and/or one or more nodal points disposed at locations that are remote with respect to the individual DCUs. The free space optical control and/or data communication links 140 may be preset or reconfigurable during data center operations. Further, links 140 between the N nodal points (A, B, C . . . ) may be direct or indirect. Network controller 210 may include a router disposed at a remote nodal point A external to the plurality of DCUs. The router may be configured to establish the one or more free space optical control and/or data communication links between nodal points (B, C . . . ). An exemplary router, which may include an electro-optical deflector, may be configured to switch a B-to-A link to an A-to-C link. The router may, additionally or alternatively, be arranged to pre-establish the one or more free space optical control and/or data communication links between the nodal points (A, B, . . . ) based on a pointing table. The router may be configured to establish or one-to-many links between the nodal points (A, B, . . . ) and/or N-to-N connectivity between the nodal points (A, B, . . . ). The router may establish N-to-N connectivity between the nodal points (A, B, . . . ) by establishing one-to many links from a nodal point A to M other nodal points, where M<N.

One or more free space optical communication links 140 in internal network 220 may be preset for data center 200 operations. Additionally or alternatively, one or more links 140 may be a dynamic link establishable during data center operations, for example, under the supervision of network controller 210 and/or a DCU's OIU (e.g., OIU 120). Network controller 210 and/or OIU 120 may be configured to establish the dynamic link during data center operations using, for example, using a search or scanning process to identify appropriate nodal points 150. Further, network controller 210 and/or OIU 120 may be configured to establish the dynamic link during data center operations in response to a data center process value and/or an external process value or command.

One or more free space optical communication links 140 in internal network 220 across the data center 200 may be nodal point-to-nodal point link and/or a nodal point-to-multinodal point link. Links 140 may include links between a DCU and its neighbors according to a specified hierarchy. For example, the links may be arranged to include links between a DCU and its proximate or nearest neighbors or only between a DCU and its next nearest neighbor, etc.

One or more free space optical communication links 140 may have low and high bandwidth channels. The low bandwidth channels may, for example, be RF communication channels and the high bandwidth channels may, for example, be optical wavelength communication channels. Internal network 220 may be configured to send, for example, instructions, status information, sensor data and/or other low payload signals over the low bandwidth channels and application data and/or other high payload signals over the high bandwidth channels. Internal network 220 may, for example, be configured to respectively send low payload and high payload signals over the low and high bandwidth channels in parallel.

Optical communication links 140 in internal network 220 may be arranged in a bus, a star, a ring and/or a hybrid topology. Further, internal network 220 may include internal buffers (270) configured to compensate for link path-length differences. Internal network 220 may be configured so that at least two of the optical communication links have equal lengths. Exemplary internal network 220 of optical data communication links 140 may include tunable and/or fixed-type add-drops, skip-routed rings and/or quartile rings. The network may be further configured to provide expander-graph type redundant interconnectivity (e.g., redundant meshes operating at a number of discrete wavelengths) between the DCUs.

Figure 3:
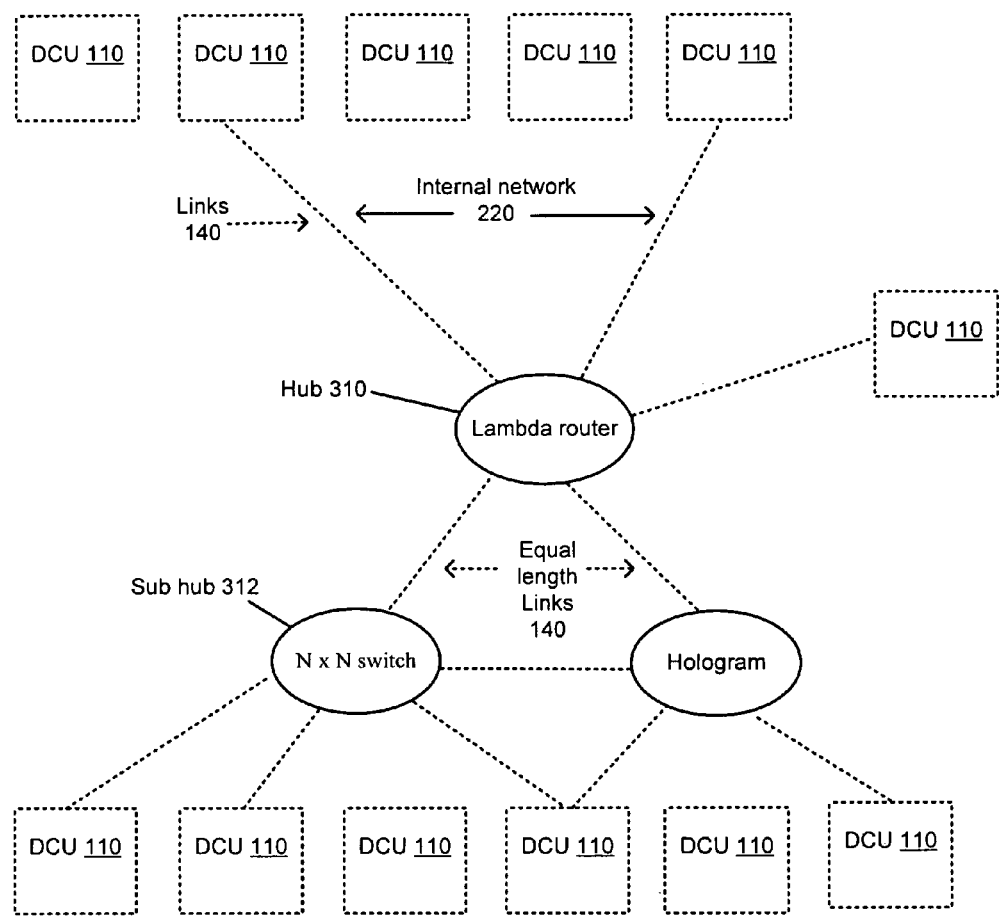
FIGS. 3, 4 and 5 are block diagrams further illustrating the exemplary data center and the internal network of FIG. 2, in accordance with the principles of the solutions described herein.

With reference to FIG. 3, which shows further features of data center 200, in an exemplary internal network 220, DCU-DCU optical communication links 140 may be arranged so that at least a first group of DCU-DCU links (>2 links) passes through a first hub 310. One or more links 140 to hub 310 may have multiple distinct wavelength channels. A selection of the group of data center units linked to the first hub may be dynamic. Hub 310 may include an N×N switch operable to interconnect the group of data center units. Alternatively of additionally hub 310 may include a lambda-router. Internal network 220 may include one or more central hubs (e.g., hub 310). Exemplary internal network 220 may further include an arrangement of links from a first sub hub 312 to a selected grouping of data center units and links from the first sub-hub 312 to the first hub 310, a second sub-hub 312 and/or other DCU. The selected grouping of data center units linked to the first sub hub may be dynamic. Data center 200 may include suitable switches operable to connect the selected grouping of data center units to the hub, the second sub-hub and/or the other data center unit.

Exemplary hub 310 and/or sub hub 312 may include a hologram, which is configured to redirect one or more incident light beams according to a predefined routing. The predefined routing may be digitally written in the hologram, for example, before or during data center operation.

Figure 4:
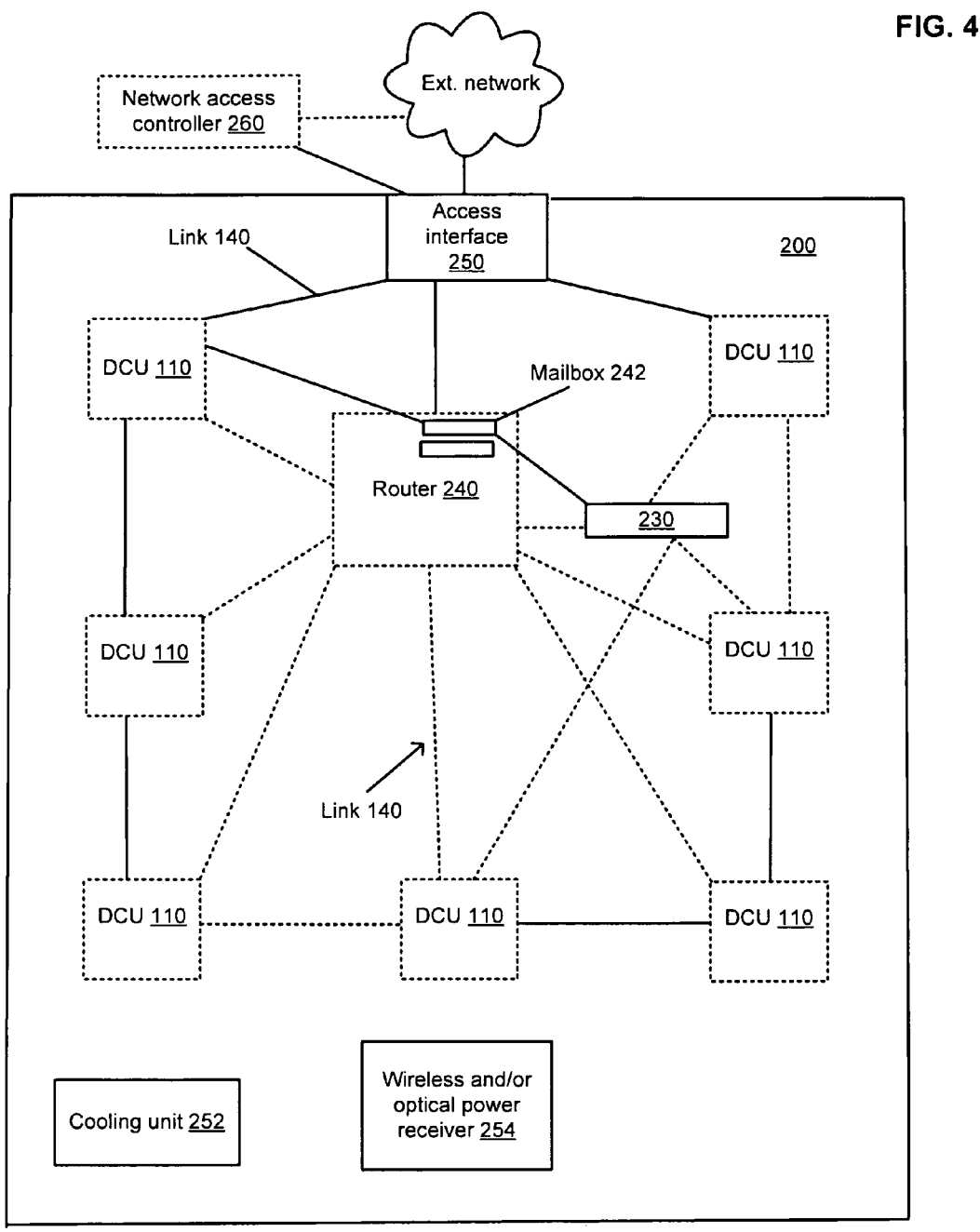

With reference to FIG. 4, data center 200 may further include a router (240) configured to route data between the DCUs over the one or more free space optical communication links 140 (FIG. 4). Router 240 may, for example, be a passive router, an active router, a mirror assembly, a holographic reflector, an optical switch, and/or a receiver/transmitter with electronic switching. Router 240 may be configured to use logical addressing for routing data between the data center units and may route data to one or more mailboxes in lieu of a physical address. Router 240 may be configured to map data to and/or from the one or more mailboxes 242 to one or more of the DCUs. One or more mailboxes 242 may correspond to one or more different data center applications and/or data center units. Mailboxes 242 may be dynamically assignable during data center operations to one or more different data center applications and/or DCUs.

Data center 200 may further include an access interface 250 coupling the data center to the external network (FIG. 4). Access interface 250 may include one or more optical elements configured to link the external network to internal network 220 of the one or more free space optical communication links 140. The one or more optical elements comprise at least one of a reflecting mirror, a steerable telescope, a hemispherical lens, an optical-optical switch, an opto-electronic switch, electronic switch an optical beam generator, an optical signal modulator, an optical frequency convertor, an electric-to optical convertor, an optical-to-electric convertor, an electro-optical beam steering element, an acoustic-optical beam steering element, a diffractive beam steering element, and/or a mechanically steerable optical element.

A network access controller 260, which may be internal or external to data center 200, may be arranged to interface data center 200 to an external data network (e.g. via access interface 250). Network access controller 260 may be arranged to communicate data to and/or from a first of the plurality of the data center units over a free space optical control and/or data communication link. A nodal point 150 in internal network 220 may correspond to the network access controller 260 arranged to interface data center 200 to an external data network. Like internal network controller 210, network access controller 260 may include one or more optical elements (e.g., a reflecting mirror, a steerable telescope, a hemispherical lens, an optical-optical switch, an opto-electronic switch, electronic switch an optical beam generator, an optical signal modulator, an optical frequency convertor, an electric-to optical convertor, an optical-to-electric convertor, an electro-optical beam steering element, an acoustic-optical beam steering element, a diffractive beam steering element, and/or a mechanically steerable optical element).

With further reference to FIG. 5, data center 200 may optionally include a cooling arrangement 252 coupled to one or more of the plurality of DCUs disposed in the region. Cooling arrangement 252 may, for example, be based on a spray, blown air/gas, and/or a LN2 coolant. Data center 200 also may optionally include an optical power receiver, a wired power receiver, a wireless power receiver and/or a microwave power receiver.

Figure 6:
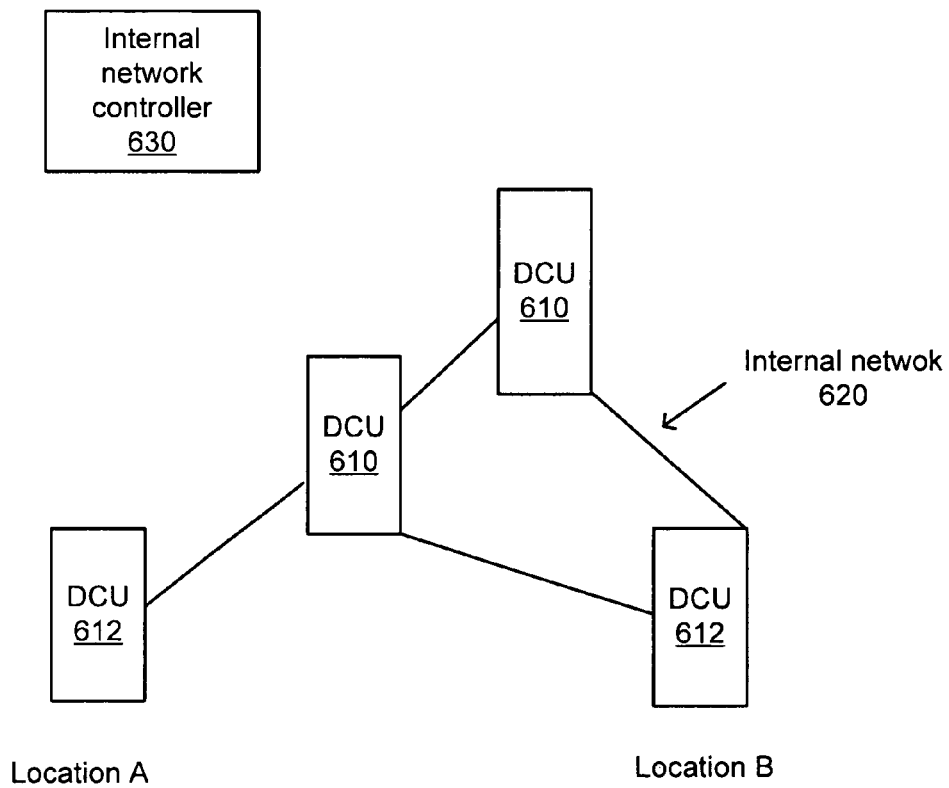
FIG. 6 is a block diagram illustrating an exemplary data center deploying one or more mobile data center bottles or units, in accordance with the principles of the solutions described herein.

FIG. 6 shows another exemplary data center 600. Data center 600 may include a plurality of data center units (DCUs) 610 disposed in data center region. Each DCU 610 may be configured to run a part or all of a data processing application. A DCU 610 may be one of an electronic module, box, server, cards, board, and/or rack or a free standing assembly thereof. The plurality of DCUs 610 may include one or more optical interface units (e.g., OIU 120). The optical interface units, like OIU 120, may include at least one of an optical beam generator, a beam-forming circuitry, an optical signal receiver, and an optical-to-electrical signal converter. At least one of the DCUs may be a mobile DCU 612 movable between a first location A and a second location B in the data center region. A DCU 610/612 may include a cooling unit.

Data center 600 further includes a reconfigurable internal network 620 of one or more free space optical communication links inter-linking of one or more of the plurality of DCUs, and an internal network controller 630 configured to control inter-linking of one or more of the plurality of DCUs 610 including mobile DCU 612 at its first and second locations to the reconfigurable internal network 620. Mobile DCU 612 may include a power and/or utility receiver (e.g., a wireless power receiver 114 and/or a microwave power receiver), which is configured to be coupled to, for example, a power supply at the first location.

A nodal point in reconfigurable internal network 620 may correspond to the optical interface unit of a first of the plurality of DCUs. A nodal point in reconfigurable internal network may be external to the plurality of data center units. A further nodal point may correspond to a network access controller (e.g., controller 260) arranged to interface the data center to an external data network. Each nodal point in reconfigurable internal network 620 may include one or more optical elements that are configurable to establish the one or more free space optical communication links. The optical elements may include one or more of a reflecting mirror, a steerable telescope, a hemispherical lens, an optical router, an electro-optical beam steering element, and/or a mechanically steerable optical element.

The links in reconfigurable internal network 620 may include free space optical communication links that are preset and/or dynamic links establishable during operation of the data center. Further, links may include nodal point-to-nodal point and/or a nodal point-to-multinodal point free space optical communication links. The links may be arranged according to a specified hierarchy (e.g., first links between a first of the plurality of data center units and its nearest or proximate neighbors).

Internal network controller 630, which can control inter-linking of one or more of the plurality of DCUs 610, may be configured to optically and/or wirelessly control inter-linking of one or more of the plurality of DCUs 610 including mobile DCU 612 at its first and/or second locations to the reconfigurable internal network of free space optical communication links. Like network controller 210 in data center 200, internal network controller 630 in data center 600 may include or more optical elements (e.g., a reflecting mirror, a steerable telescope and/or a hemispherical lens, an electro-optical beam steering element and/or a mechanically steerable optical element, an optical beam generator, a beam-forming circuitry, an optical signal receiver, and/or an optical-to-electrical signal converter. Internal network controller 630 may be configured to reposition mobile DCU 612 from the first to the second location in the region in response to a data center application demand and/or an external process value or command. Internal network controller 630 may establish a dynamic link to the mobile DCU during data center operations using a search or scanning process.

Data center 600 may further include a router (e.g., router 240) configured to route data between the data center units over the one or more free space optical communication links of internal network. The router may include at least one of a passive router, an active router, a mirror assembly, a holographic reflector, an optical switch and/or a receiver/transmitter with electronic switching. Like router 240, the router in data center 600 may be configured to use logical addressing for routing data between the data center units. The router may, for example, route data to one or more mailboxes in lieu of a physical address and map data to and/or from the one or more mailboxes to a respective one or more of the plurality of DCUs 610/612. The mailboxes, which may correspond or be assigned to one or more different data center applications and/or data center units, may be dynamically assigned during data center operations.

Figure 7:
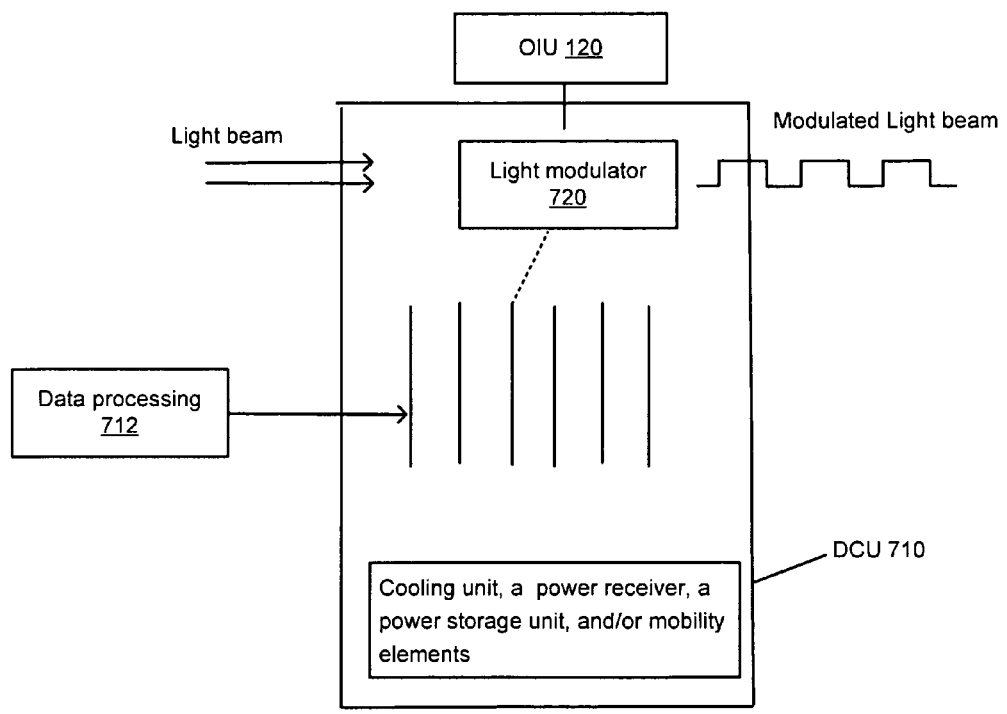
FIG. 7 is a block diagram illustrating an exemplary data center unit, which includes a light beam modulator configured to modulate a raw light beam and to transmit a modulated light beam over a free space optical communication link, in accordance with the principles of the solutions described herein.

FIG. 7 shows an exemplary data center unit (DCU) 710, which is configured to be connected to other devices via a network of one or more free space optical communication links. DCU 710 may include one or more data processing units (DPUs) 712 that are configured to run a part or all of a data processing application, and a light beam modulator 720 coupled to one or more DPUs 712.

DPU 712 may include one or more data processing circuits (e.g., electronic modules, boxes, servers, cards, boards, and/or racks or free standing assemblies thereof). Modulator 720 may be configured to modulate a raw light beam received from a source internal or external to DCU 710, and to transmit a modulated light beam over a free space optical communication link. Modulator 720 may be configured to modulate one or more of an amplitude, a pulse format, a phase, a frequency and/or polarization of the raw light beam. Further, DPU 712 may include a demodulator configured to remove modulation from a modulated light beam.

DCU 710 may include an optical interface unit (e.g., OIU 120) configured to connect or disconnect DCU 710 to or from the network under free space optical signal control. The optical interface unit, like OIU 120, may include opto-mechanical and/or opto-electric transducers responsive to optical signal control to connect or disconnect the data processing unit to or from the network, a light beam transmitter, pass-through device, and/or a receiver, an optical beam generator, a beam-forming circuitry, an optical signal receiver/detector, and/or an optical-to-electrical signal converter. Modulator 720 may be internal or external to optical interface unit.

DCU 710 may further include control circuitry configured to supervise operations of the optical interface unit, DPUs 712, modulator 720, and/or additional data center unit components. The additional data center unit components may, for example, include a cooling unit, a wireless, microwave, and/or optical power receiver, a power storage unit, and/or mobility elements configured to move the data center unit from a first position to a second position in a data center.

Figure 8:
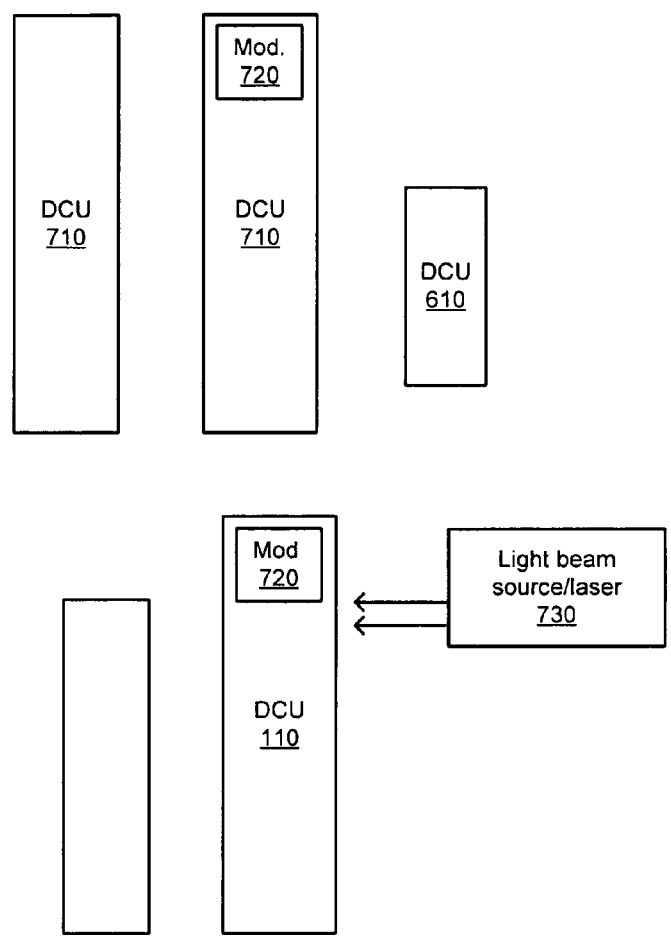
FIG. 8 is a block diagram illustrating an exemplary data center deploying one or more of the data center units of FIG. 7, in accordance with the principles of the solutions described herein.

FIG. 8 shows an exemplary data center 800 deploying DCU 710. Data center 800 may also deploy other types of DCUs (e.g., DCU 110, DCU 610, DCU 612, etc.). Each DCU may include one or more of electronic modules, boxes, servers, cards, boards, and/or racks or free standing assemblies thereof. Each DCU may be configured to run a part or all of a data processing application.

Data center 800 may include at least a modulator (e.g., modulator 720) co-disposed with one of the DCUs in the data center. The modulator may be configured to modulate a raw light beam and transmit a modulated light beam over the one or more free space optical communication links. The modulator may be configured to modulate one or more of an amplitude, a pulse, a format, a phase, a frequency and/or polarization of the raw light beam. Further, data center 800 may include a demodulator configured to remove modulation from a modulated light beam.

Data center 800 may further include a light beam source disposed external to the first of the plurality of data center units and configured to provide the raw light beam to the modulator. The light beam source may be internal or external to a data center region. The light beam source may, for example, be off-board laser-device. The output of the light beam source may be piped in to the data center region or to modulator 720 over free space and/or via an optical fiber. In a version of data center 800, the light beam source may include a plurality of light beam generators, which may generate light of different wavelengths.

Like data centers 200 and 600, data center 800 may include an internal network (e.g., internal network 220, 620) of one or more free space optical communication links (e.g., links 140) to at least a first of the plurality of data center units, a network controller (e.g., network controller 210, 630) configured to connect or disconnect the plurality of data center units from the internal network, and an access interface/controller (e.g., access interface 240/controller 260) coupling the data center to an external network.

Further, like in data centers 200 and 600, each nodal point in the internal network in data center 800 may include one or more optical elements that are configurable to establish the one or more free space optical communication links (e.g., a reflecting mirror, a steerable telescope, a hemispherical lens, an optical router, an electro-optical beam steering element, and/or a mechanically steerable optical element).

Figure 9:
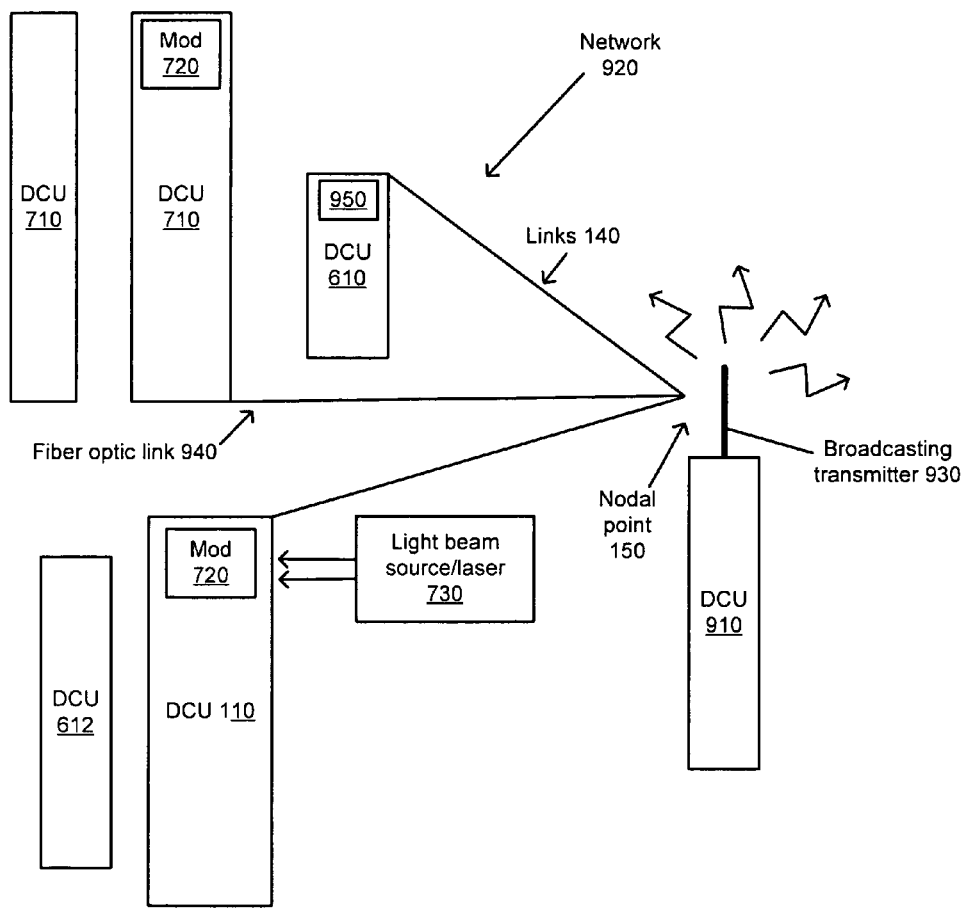
FIG. 9 is a block diagram illustrating an exemplary data center deploying one or more of the data center units that are configured to broadcast optical control and/or data signals over an internal network of one or more optical communication links, in accordance with the principles of the solutions described herein.

FIG. 9 shows another exemplary data center 900 deploying one more DCUs 910 configured to broadcast optical control and/or data signals in the region over an internal network 920 of one or more optical communication links. Data center 900 may include various types of DCUs (e.g., DCU 110, DCU 610, DCU 612, DCU 710, etc.). Each DCU may include one or more of electronic modules, boxes, servers, cards, boards, and/or racks or free standing assemblies thereof. Each DCU may be configured to run a part or all of a data processing application. At least a first of the plurality of DCUs may include an optical interface unit (OIU) configured to connect the first DCU to the internal network in response to a free space optical control signal. Internal network 920 in data center 900, like networks 220 and 620, may include free space optical communication links (e.g., links 140) between one or more nodes associated individual DCUs and/or one or more nodes interposed between the DCUs. Internal network 920 may further include fiber optic links 940 between one or more nodes.

DCU 910 may include a broadcasting transmitter 930. Broadcasting transmitter 930 may be configured to broadcast a multiplicity of optical control and/or data signals simultaneously and/or sequentially to a plurality of receivers (e.g., OIU 120) in data center 900. A receiver may be configured to listen to broadcasts from a single transmitter or to multiple transmitters. In any case, a receiver may be configured to identify which of the multiplicity of optical control and/or data signals (messages) are intended for it (the receiver). Conversely, broadcasting transmitter 930 may include receiver-identifying indicia in its broadcasted messages. The receiver-identifying indicia included in the broadcasted signals may, for example, include message headers, signal wavelength, signal polarization, transmit time slots, and/or any combination thereof. A receiver may be configured to identify which of the multiplicity of optical control and/or data signals (messages) are intended for it by recognizing the receiver-identifying indicia included in or associated with the broadcasted signals.

In a version of data center 900, DCU 910/broadcasting transmitter 930 may be configured to broadcast a free space optical control/and or data signal over the internal network at different wavelengths and/or polarizations. An intended recipient may be designated by a respective wavelength and/or polarization. A receiving DCU may be configured to recognize that it is the intended recipient of a free space optical control/and or data signal broadcast over the internal network by recognizing its respective wavelength signal and/or polarization.

Additionally or alternatively, DCU 910/broadcasting transmitter 930 may be configured to broadcast a free space optical control/and or data signal over the internal network at different at different transmit time slots. An intended recipient may be designated by a respective transmit time slot. A receiving DCU may be configured to recognize that it is the intended recipient of a free space optical control/and or data signal broadcast over the internal network by recognizing its respective transmit time slot.

Additionally or alternatively, DCU 910/broadcasting transmitter 930 may be configured to broadcast free space optical control/and or data signals over the internal network with different headers. An intended recipient may be designated by a respective header. A receiving DCU may be configured to recognize that it is the intended recipient of a free space optical control/and or data signal broadcast over the internal network by recognizing its respective header.

In a further version of data center 900, one or more DCUs may be associated with respective identifying-wavelengths, and each transmitting or sending DCU (e.g., DCU 910) may be configured to broadcast optical control and/or data signals at its respective identifying-wavelength over internal network 920. Conversely, a receiving DCU interfaced with the internal network may be configured to identify a sending DCU by the identifying-wavelength of the optical control and/or data signals broadcast by the sending DCU. Alternatively or additionally, one or more DCUs may be associated with respective signal polarization, and each transmitting or sending DCU may be configured to broadcast optical control and/or data signals at its respective signal polarization. Conversely, a receiving DCU interfaced with the internal network may be configured to identify a sending DCU by the polarity of its broadcasted optical control and/or data signals.

One or more DCUs in data center 900 (e.g., DCU 910) may be configured to broadcast optical control and/or data signals over at least a color region (~1% wide frequency region). The color region may be a color region at about 1.44, 1.47, or 1.55 microns wavelength. In an exemplary implementation of data center 900, a multiplicity of the DCUs may be configured to broadcast optical control and/or data signals over of two or more color regions. In an additional or alternate implementation, a first of the plurality of DCUs may be configured to broadcast a free space optical control/and or data signal in which an intended recipient may, for example, be designated by a respective transmit time slot in the signal. Conversely, a receiving DCU may be configured to recognize that it is the intended recipient of the broadcasted signal by recognizing its respective transmit time slot in the signal.

In a further exemplary implementation of data center 900, a multiplicity of the DCUs may be associated with a respective combination of identifying-wavelengths and time slots, and the multiplicity of the data center units may be configured to broadcast optical control and/or data signals with their respective combination of identifying-wavelengths and time slots. Conversely, a receiving DCU may be configured to identify a sending DCU by recognizing the sending DCU's respective combination of the identifying-wavelengths and time slots.

In yet another exemplary implementation of data center 900, a multiplicity of the data center units may be associated with respective identifying-wavelengths, and the multiplicity of the data center units may configured to simultaneously broadcast optical control and/or data signals at their respective identifying-wavelengths over the internal network. A receiving DCU may include a suitable detector 950 configured to wavelength-demultiplex a received optical control and/or data signal. Detector 950 may, for example, include an array of photodiodes operating at different wavelengths and an optional buffer to buffer the wavelength-demultiplexed signal.

Figure 10:
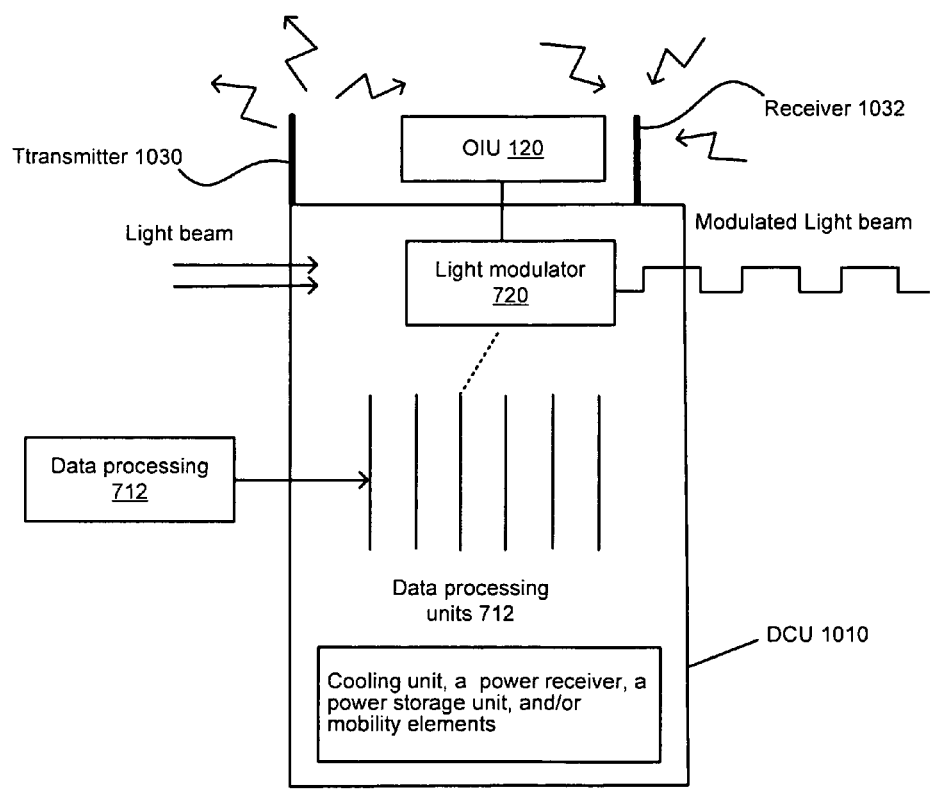
FIG. 10 is a block diagram illustrating an exemplary data center unit, which includes a data signal transmitter and/or a receiver coupled to the one or more data processing units therein, in accordance with the principles of the solutions described herein.

FIG. 10 shows another exemplary data center unit (DCU) 1010, which may be deployed, for example, in the data centers 200, 600, 800 and 900 described hereto or in any other data center. DCU 1010, like DCUs 110, 610 and 710, may include one or more data processing units (e.g., data processing units 712, electronic modules, boxes, servers, cards, boards, and/or racks or free standing assemblies thereof) that are configured to run a part or all of a data processing application. DCU 1010 may also include an optical interface unit (e.g., OIU 120) configured to connect the DCU to a network of optical communication links including the plurality of optical communication links extending from and leading to the DCU.

DCU 1010 further includes a transmitter 1030 and/or a receiver 1032 coupled to the one or more data processing units. Transmitter 1030 and receiver 1032 may have a transmitting position and a receiving position, respectively.

Transmitter 1030 in its transmitting position may be configured to broadcast optical control and/or data signals over a plurality of optical communication links extending from the DCU in its transmitting position. The broadcasted optical control and/or data signals may be over one or more color regions. A color region (e.g., ~1% wide frequency region) may, for example, be a color region at about 1.44, 1.47, or 1.55 microns wavelength.

Transmitter 1030 in its transmitting position may be configured to broadcast configured to broadcast a multiplicity of optical control and/or data signals simultaneously and/or sequentially to a plurality of receivers. DCU 1010/transmitter 1030 may be associated with DCU/transmitter-identifying indicia that may be included in its broadcasted messages. The DCU/transmitter-identifying indicia included in or associated with the broadcasted signals may, for example, include message headers, signal wavelength, signal polarization, transmit time slots, angle of transmission, and/or any combination thereof.

For example, DCU 1010 may be associated with an identifying-wavelength, and transmitter 1030 in its transmitting position may be configured to broadcast optical control and/or data signals at the DCU's identifying-wavelength. Alternatively or additionally, DCU 1010 may be associated with a signal polarity, and transmitter 1030 in its transmitting position may be configured to broadcast optical control and/or data signals at the DCU's identifying-signal polarity. In case, DCU 1010 is associated with a combination of identifying-wavelengths and time slots, transmitter 1030 in its transmitting position may be configured to broadcast optical control and/or data signals with the data center unit's combination of identifying-wavelengths and time slots.

Receiver 1032 in its receiving position may be configured to receive multiple optical control and/or data signals over one or more free space optical communication links leading to the DCU. Receiver 1032 may further be configured to identify a sending DCU by recognizing the DCU/transmitter-identifying indicia included or associated with the received signals. For example, receiver 1032 may be configured to identify a sending DCU by recognizing an identifying-wavelength of the optical control and/or data signals broadcast by the sending DCU. Receiver 1032 may be additionally or alternatively configured to identify a sending DCU by recognizing other sending-DCU identifying indicia (e.g., identifying-polarization, identifying-transmit time slots, angular direction) of the optical control and/or data signals transmitted by the sending DCU. In case, DCU 1010 or other sending DCUs are associated with a combination of identifying-wavelengths and time slots, receiver 1032 in its receiving position may be configured to recognize a sending DCU by recognizing the combination of the identifying-wavelengths and time slots associated with the sending DCU. Further, an exemplary receiver 1032 may be configured to recognize a sending DCU by recognizing an angular direction of a received signal. Receiver 1032 may include an imaging device for this purpose.

In a version of DCU 1010, receiver 1032 also may be additionally or alternatively configured to recognize that it is an intended recipient of a free space optical control/and or data signal by recognizing receiver-identifying indicia (e.g., its respective transmit time slot) in the signal. Transmitter 1030 in its transmitting position may be configured to broadcast optical control and/or data signals so that intended recipient/receiver 1032 is designated by a respective transmit time slot in the signal.

Receiver 1032 in its receiving position may be configured to wavelength-demultiplex received optical control and/or data signals using, for example, an array of photodiodes operating at different wavelengths. Receiver 1032 may include a buffer configured to hold or buffer the wavelength-demultiplexed signal.

Figure 11:
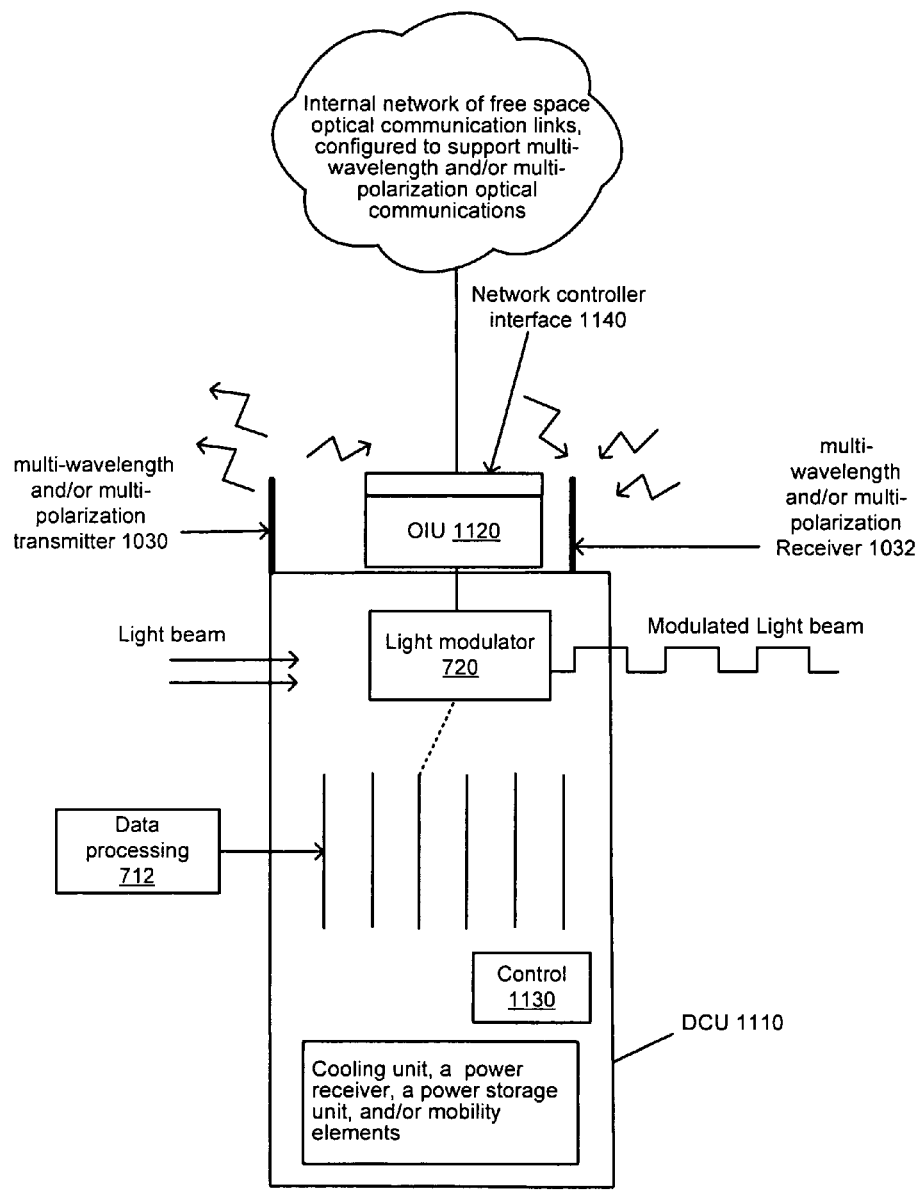
FIG. 11 is a block diagram illustrating an exemplary data center unit, which is configured to be deployed in a data center having a network supporting multi-wavelength and/or multi-polarization optical communications, in accordance with the principles of the solutions described herein.

FIG. 11 shows yet another exemplary data center unit (DCU) 1110, which may be deployed, for example, in a data center having a network supporting multi-wavelength and/or multi-polarization optical communications or other suitable data centers (e.g., data centers 200, 600, 800 and 900). DCU 1110, like DCUs 110, 610, 710, and 1010, may include one or more data processing units (e.g., data processing units 712, data processing circuits, electronic modules, boxes, servers, cards, boards, and/or racks or free standing assemblies thereof) that are configured to run a part or all of a data processing application. DCU 1110 may also include an optical interface unit (OIU) 1120 configured to connect the DCU to a network of optical communication links including the plurality of optical communication links extending from and leading to the DCU. OIU 1120 may be configured to connect DCU 1110 to a network supporting multi-wavelength and/or multi-polarization optical communications.

OIU 1120, like OIU 120 may include opto-mechanical, opto-acoustic, and/or opto-electric transducers responsive to optical signal control to connect or disconnect the data processing unit to or from the network, a light beam transmitter, pass-through device, and/or a receiver, an optical beam generator, a beam-forming circuitry, an optical signal receiver/detector, and/or an optical-to-electrical signal converter. Modulator 720 may be internal or external to OIU 1120. The optical elements of OIU 1120 may be configured for multi-wavelength and/or multi-polarization optical communications by DCU 1110 over the network. OIU 1120 may have a responsive interface to a network controller, which is configured to establish a dynamic link during data center operations, for example, using a search or scanning process.

A combination of DCU 1110 and a specific data processing application running on DCU 1110 may be assigned a designated wavelength or discrete set of wavelengths for mutual data communications over the network. The designated wavelength or wavelengths may be assigned dynamically. A discrete set of one or more wavelengths may be assigned for data transmissions by DCU 1110. The same or other discrete set of one or more wavelengths may be assigned for receipt of data by DCU 1110.

Figure 12:
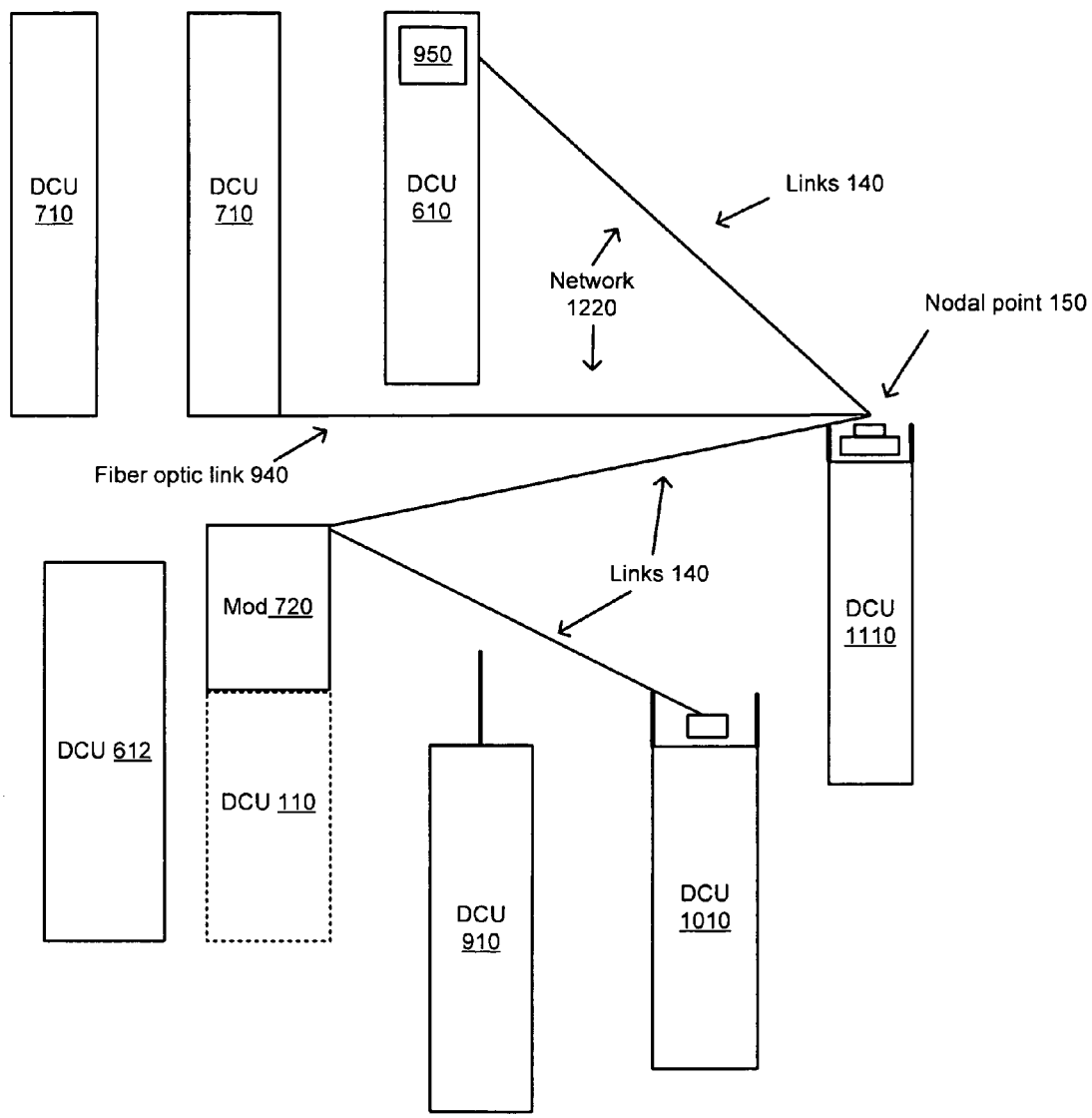
FIG. 12 is a block diagram illustrating an exemplary data center deploying one or more of the data center units of FIG. 10 and/or FIG. 11, in accordance with the principles of the solutions described herein.

FIG. 12 shows another exemplary data center 1200 deploying one or more DCUs and/or one or more DCUs 1010 and/or DCUs 1110. Data center 1200 may also deploy other types of data center units (e.g., DCUs 110, 610, and 710). Each DCU may include one or more of electronic modules, boxes, servers, cards, boards, and/or racks or freestanding assemblies thereof. Each DCU may be configured to run a part or all of a data processing application. A DCU (e.g., DCU 1010) in data center 1200 may include an optical receiver configured to receive multiple optical control and/or data signals over one or more free space optical communication links leading to the DCU. The optical receiver (e.g., receiver 1032) in its receiving position may receive the multiple optical control and/or data signals over a corresponding multiplicity of free space optical communication links leading to the at least one DCU simultaneously and/or sequentially. The optical receiver may be configured to receive optical control and/or data signals over at least a color region (~1% wide frequency region). Exemplary color regions may be regions at about 1.44, 1.47, and 1.55 microns wavelengths. In an implementation of data center 1200, the optical receiver in its receiving position may be configured to receive optical control and/or data signals over of two or more color regions.

The various DCUs in data center 1200 may be linked by an internal communications network 1220, which includes one or more free space optical communication links leading to at least one DCU. At least a first of the plurality of DCUs may include an optical interface unit (OIU) configured to connect the first DCU to an internal network 1220 in response to a free space optical control signal. Internal network 1220 in data center 1200, like networks 220 and 620, may include free space optical communication links (e.g., links 140) between one or more nodes associated individual DCUs and/or one or more nodes interposed between the DCUs. Internal network 1220 may further include fiber optic links 940 between one or more nodes. Data center 1200 may include a network controller configured to supervise connecting and/or disconnecting individual DCUs from internal network 1220 (e.g., by acting on the OIU via interface 1140).

Internal network 1220 may be configured to support multi-wavelength and/or multi-polarization optical communications over links 140/940.

Internal network 1220 may be arranged to include one or more virtual local area networks (LANs) linking respective groups DCUs. The one or more virtual LANs may be assigned respective wavelengths for optical signal transmission. Likewise, a specific data processing application and the DCUs running the specific data processing application may be assigned a designated wavelength for mutual data communications over internal network 1220. The wavelength assignments may be preset or dynamic. A specific DCU may be assigned discrete set of wavelengths for data transmission and/or data receiving over internal network 1220.

Further, internal network 1220 may be arranged in a hierarchy of networks. An hierarchy of diverse networks may, for example, be based on wavelengths and/or spatial diversity. Internal network 1220 may, for example, include a first network, which is optically isolated from a second network. For this purpose, data center 1200/internal network 1220 may include receivers that are range and/or direction limited and configured to optically isolate the first network from the second network. The isolated first and second networks may, for example, include an optically isolated wavelength-addressed n×n network, a wavelength-addressed 32×32 network.

One or more DCUs in data center 1200 may be associated with respective identifying-wavelengths and/or signal polarities, and the DCUs may be configured to broadcast optical control and/or data signals at their respective identifying-wavelengths and/or signal polarities. Conversely, a DCU's optical receiver may be configured to identify a sending DCU by the identifying-wavelength and/or signal polarity of the optical control and/or data signals broadcast by the sending DCU.

Further, one or more DCUs in data center 1200 may be configured to broadcast free space optical control/and or data signals. A DCU may be configured to broadcast a free space optical control/and or data signal in which an intended recipient is designated by a respective transmit time slot in the signal. Conversely, a DCU's optical receiver may be configured to recognize that it is the intended recipient of the free space optical control/and or data signal broadcast by recognizing its respective transmit time slot in the signal. Further, a multiplicity of DCUs may be associated with a respective combination of identifying-wavelengths and/or time slots, and configured to broadcast optical control and/or data signals with their respective combination of identifying-wavelengths and time slots. Conversely, a DCU's optical receiver may be configured to identify a sending DCU by recognizing the sending DCU's respective combination of the identifying-wavelengths and/or time slots.

The multiplicity of DCUs associated with respective identifying-wavelengths may be configured to simultaneously broadcast optical control and/or data signals at the DCUs respective identifying-wavelengths over an internal network of one or more free space optical communication links. Conversely, a DCU's optical receiver may be configured to wavelength-demultiplex and optionally buffer a received optical control and/or data signal. For this purpose, the DCU's optical receiver may include suitable demultiplexing circuitry, (e.g., an array of photodiodes operating at different wavelengths) and a buffer for the wavelength-demultiplexed signals. A communication link or channel between a specific pair of DCUs may be assigned a discrete set of wavelengths for transmitting and/or receiving control and/or data signals over the internal network.

In a version of data center 1200, a plurality of M broadcasting transmitters (e.g., transmitters 1030) and a plurality of N optical receivers (e.g., receivers 1032) may be associated with the plurality of DCUs in the data center. Each of the M broadcasting transmitters may be configured to broadcast optical control and/or data signals simultaneously and/or sequentially to plurality of N optical receivers. Each of the M broadcasting transmitters may be configured to broadcast optical control and/or data signals to the each of the N optical receivers over an internal network of separate free space optical communication links that form M×N distinct communication channels between pairs of the M broadcasting transmitters and the N optical receivers in the region. Each of the M×N distinct communication channels maybe assigned distinct channel-identifying indicia (e.g., signal wavelength and/or polarization, transmit time slots, headers, and/or any combination thereof, etc.). The transmitter and receiver pair associated with the channel may be respectively configured to transmit and receive optical control and/or data signals having the channel-identifying indicia (e.g. signal wavelength and/or polarization, transmit time slots, headers, and/or any combination thereof, etc.).

Figure 13:
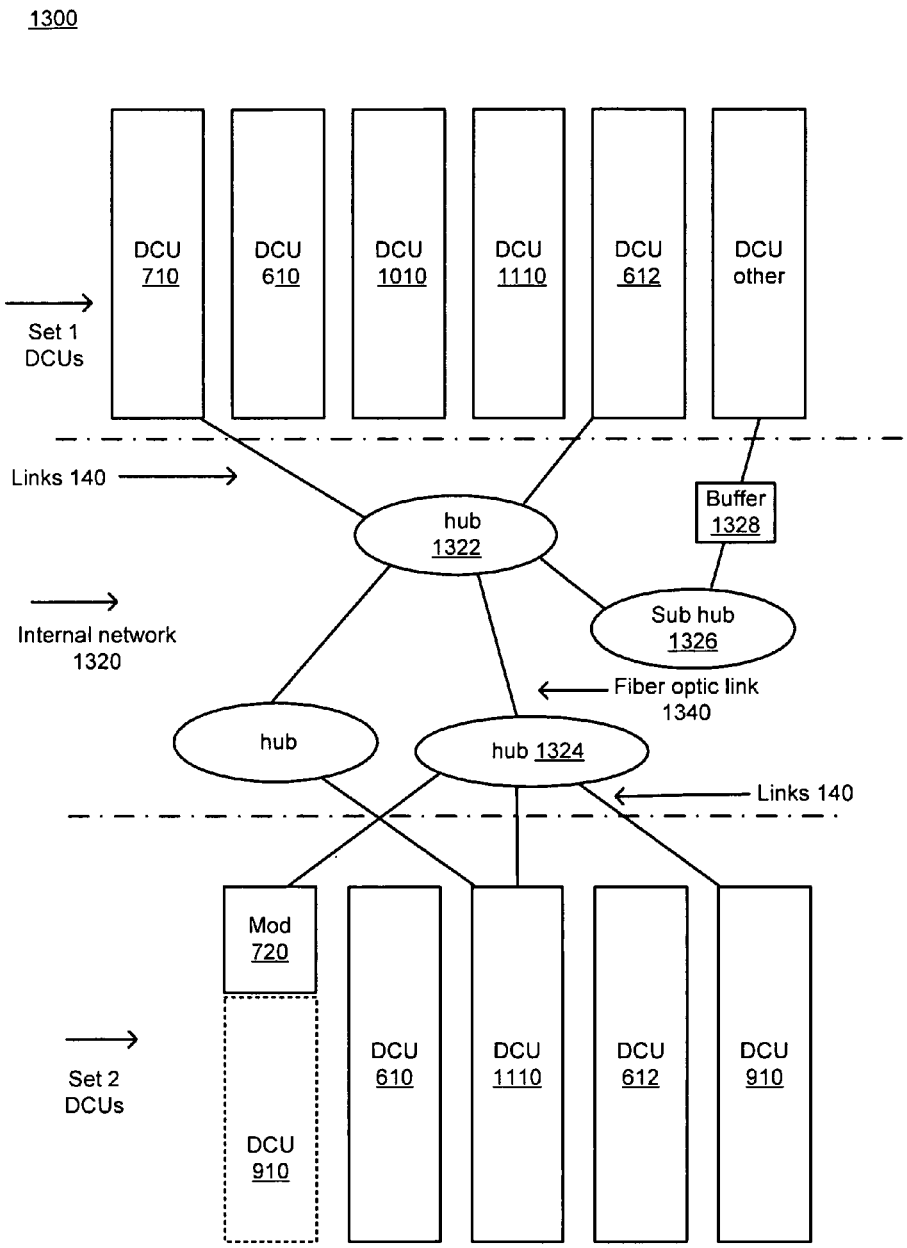
FIG. 13 is a block diagram illustrating an exemplary data center and an internal network of optical communication links between data processing units of the data center, in accordance with the principles of the solutions described herein.

FIG. 13 shows another exemplary data center 1300 deploying one or more DCUs (e.g., DCUs 110, 610, 710, 1010 and 1110, or other DCUs), which are linked by an internal network 1320 of optical communication links. Internal communication network 1320 may include one or more central hubs (1322, 1324) and/or sub-hubs (1326).

Each DCU may be configured to run a part or all of a data processing application. The DCUs may be arranged in sets, e.g., a first set (Set 1) and a second set (Set 2). The two sets of DCUs may be communicatively coupled by one or more free space optical communication links 140 to a first hub 1322 and a second hub 1324, respectively, in internal communication network 1320. A selection of the sets of DCUs linked to the first and/or second network hubs may be dynamic. The first and second hubs themselves may be linked by a free space optical communication link and/or by a fiber optic link 1340.

Internal communication network 1320 may further include an arrangement of links from a first sub hub 1326 to a selected grouping of DCUs. The selection of the grouping of DCUs may be preset or dynamic. Internal communication network 1320 may, for example, further include links first sub hub 1326 to hubs 1322 and/or 1324, a second sub-hub and/or other DCU.

In general, the optical communication links in internal communication network 1320 may be arranged in a bus, star, ring and/or hybrid topology. The links may be preset or may be dynamically establishable. Internal communication network 1320 may be arranged so that at least two of the optical communication links have equal lengths. Internal buffers 1328 may be used to compensate for link path-length differences.

A hub or sub-hub may include N×N switches operable to interconnect the set of linked DCUs. A link connected to the hubs may have multiple distinct wavelength channels, and the hub itself may include a lambda-router. A hub or sub-hub may, for example, include a hologram, which is configured to redirect one or more incident light beams according to a predefined routing. The predefined routing may be digitally written in the hologram, for example, during data center operations.

As in data centers 200 and 600, a network controller may be deployed to connect and/or disconnect individual DCUs from internal communication network 1320 via free space communication links 140.

Figure 14:
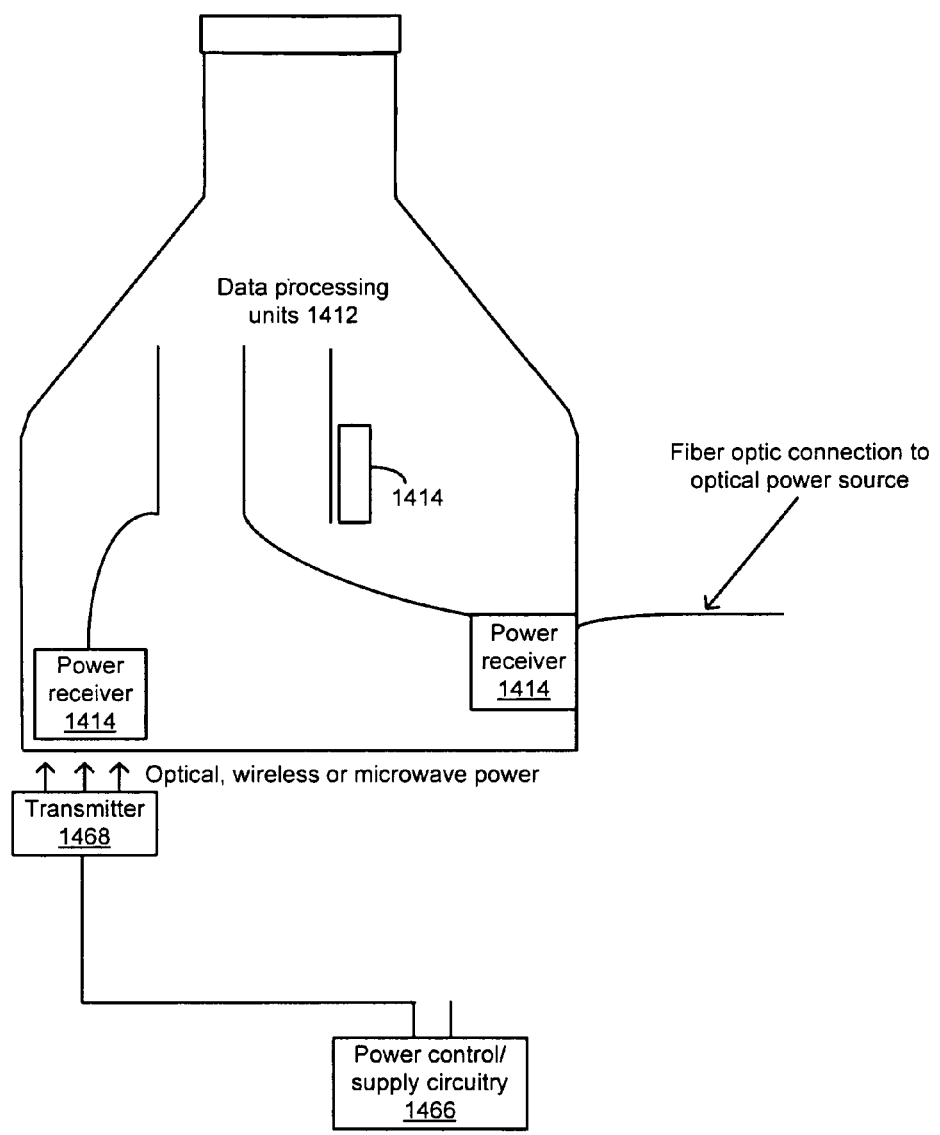
FIG. 14 is a block diagram illustrating an exemplary data center bottle, which includes one or more data processing units coupled to an optical, microwave and/or wireless power, in accordance with the principles of the solutions described herein.

FIG. 14 shows an exemplary data center bottle 1410, which includes one or more data processing units 1412 coupled to an optical, microwave and/or wireless power receiver 1414. Each data processing units 1412 may include one or more data processing circuits (e.g., electronic modules, boxes, servers, cards, boards, and/or racks or free standing assemblies thereof). Data processing units 1412 may be configured to run a part or all of a data processing application using optical, microwave and/or wireless power received by power receiver 1414.

An exemplary power receiver 1414 may be configured to receive optical power, for example, over an optical fiber or a free space link from a power transmitter/source 1468/1466. Such a power receiver 1414 may include a suitable optical power-to-electricity converter (e.g., a photo-diode, a silicon photo diode, an III-V photo-diode, and/or a compound semiconductor photo-diode) to convert received optical power to electricity. The optical power-to-electricity converter may be configured to operate at suitable low temperatures (e.g., cryogenic temperatures).

Another exemplary power receiver 1414 may be configured to receive wireless power from a wireless power transmitter (e.g., transmitter 1468). Such a power receiver 1414 may be suitably coupled to transmitter 1468 to facilitate power transfer by an electrodynamic inductive effect or by resonant inductive coupling.

Another exemplary power receiver 1414 may be configured to receive microwave power from transmitter 1468 (e.g., a phased array microwave transmitter, or cavity magnetron). Such a power receiver 1414 may include a suitable combination antenna and rectifier device to convert microwave power into electricity.

Data center bottle 1410 may be configured to be deployable in a data center that is connected to an external communications network and has an internal communications network of one or more free space optical communication links between nodal points (nodes) in the data center. Further, data center bottle 1410 may include an optical interface unit (e.g., OIU 120) configured to respond to optical control signals to connect the bottle to the internal network so that the optical interface unit corresponds to a nodal point in the internal network and the data center bottle is arranged to communicate data processing application data in data center operation over one or more free space optical communication links. The optical interface unit, like OIU 120, may be configured to connect or disconnect the data center bottle to or from the internal network under free space optical signal control. Further, the optical interface unit, like OIU 120, may include one or more of opto-mechanical and/or opto-electric transducers responsive to optical signal control to connect or disconnect the data center bottle to or from the internal network, a light beam transmitter, pass-through device, and/or a receiver, an optical beam generator, a beam-forming circuitry, an optical signal receiver/detector, and/or an optical-to-electrical signal converter. The optical interface unit may be responsive to a locating beacon (e.g., at a nodal point 150) to connect or disconnect the bottle to or from the internal network of one or more free space optical communication links.

DCU 1410 may further include suitable control circuitry configured, to supervise operations of the optical interface unit and/or additional data processing unit components including, for example, an location or identification beacon, a cooling unit, a wireless and/or optical power receiver, a power storage unit, and mobility elements configured to move the data center unit from a first position to a second position in the data center.

Figure 15:
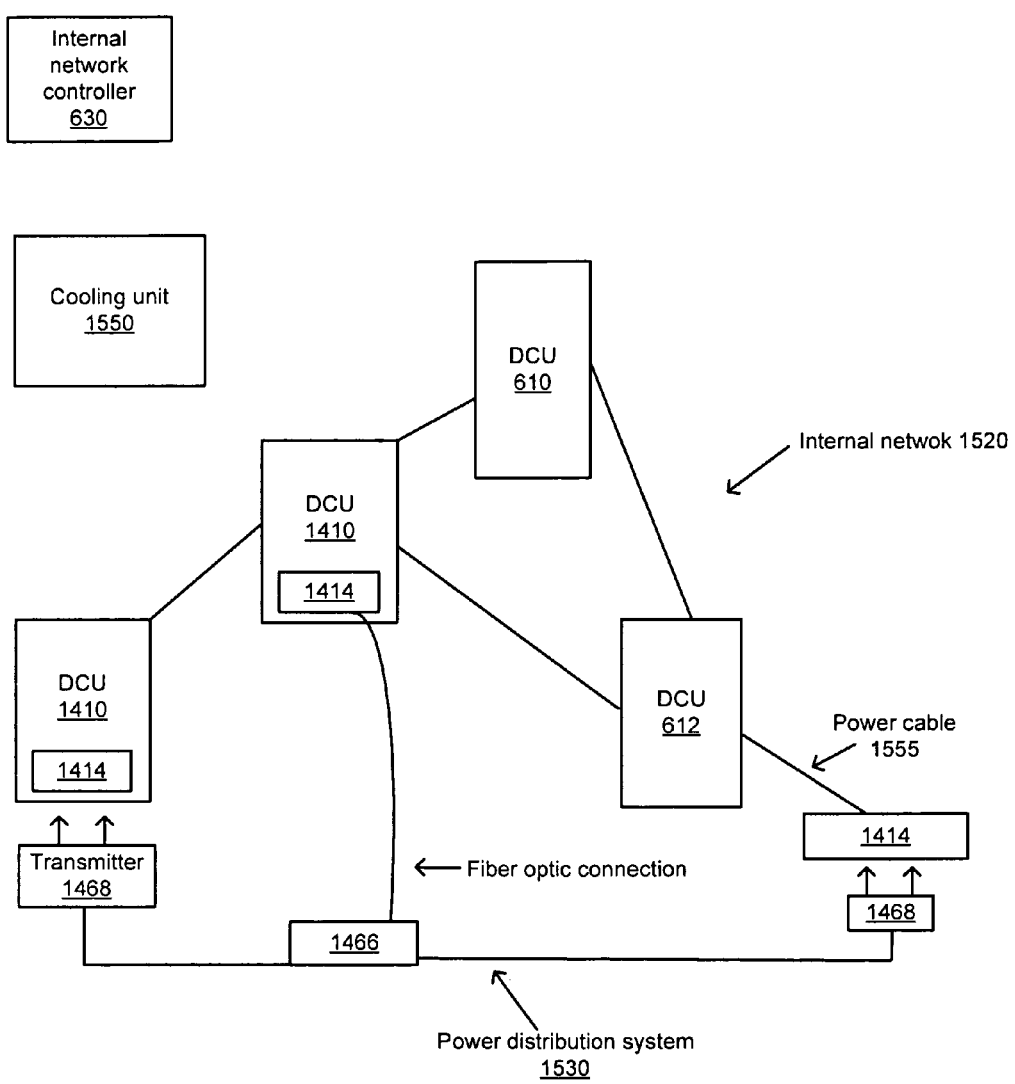
FIG. 15 is a block diagram illustrating an exemplary data center deploying one or more of the data center units of FIG. 14, in accordance with the principles of the solutions described herein.

FIG. 15 shows another exemplary data center 1500 deploying one or more data center bottles 1410. Data center 1500 may also deploy other types of data center units (e.g., DCUs 110, 610, 710 and 1110). Each DCU may include one or more of electronic modules, boxes, servers, cards, boards, and/or racks or freestanding assemblies thereof. Each DCU may be configured to run a part or all of a data processing application. Data center 1500 may further include a power distribution system 1530 configured to distribute optical, microwave and/or wireless power to the plurality of data center units disposed in the region. One or more of the DCUs may be configured to run its part or all of the data processing application using optical, microwave and/or wireless power received via the power distribution system.

Power distribution system 1530 may include an optical, microwave and/or wireless power source 1466. Further, power distribution system 1530 may include one or more suitable optical, microwave and/or wireless power transmitters 1468 connected to power source 1466, and one or more suitable power receivers 1414 disposed in data center 1500. A power receiver 1414 disposed in data center 1500 may receive power over an optical fiber connection and/or over a free space coupling of the power receiver with a power transmitter 1468. Power receivers 1414 may include an optical-to-electric power converter (e.g., a photo-diode, a silicon photo diode, a III-V photo-diode, and/or a compound semiconductor photo-diode). The optical-to-electric power converter may operate at cryogenic temperatures.

Power receivers 1414 may be co-disposed with the DCUs in the region (e.g., as in DCU 1410) or disposed at convenient locations in data center 1500 external to a DCU. A power cable 1555 may supply electrical power to a DCU from an external power receiver 1414. In general, distribution system 1530 may include one or more optical free space links and/or fiber optic links configured for off-board communications to and from the plurality of DCUs in data center 1500 and/or to distribute optical power to the DCUs.

Data center 1500 may also include a cooling arrangement 1550 coupled to one or more of the DCUs disposed in data center 1500. Cooling arrangement 1550 may be based on a spray, blown air/gas, and/or a LN2 coolant.

The DCUs disposed in data center 1500 may be electrically disjoint at least for purposes of data communications. Data center 1500 may include an internal network 1520 of optical data communication links between nodal points/DCUs across the data center. The optical data communication links may include free space and/or fiber optic links. Such an internal network 1520 of optical data communication links may include tunable and/or fixed-type add-drops, skip-routed rings and/or quartile rings. Further, internal network 1520 may be configured to provide expander-graph type redundant interconnectivity between the DCUs including, for example, redundant meshes operating at a number of discrete wavelengths.

Figure 16:
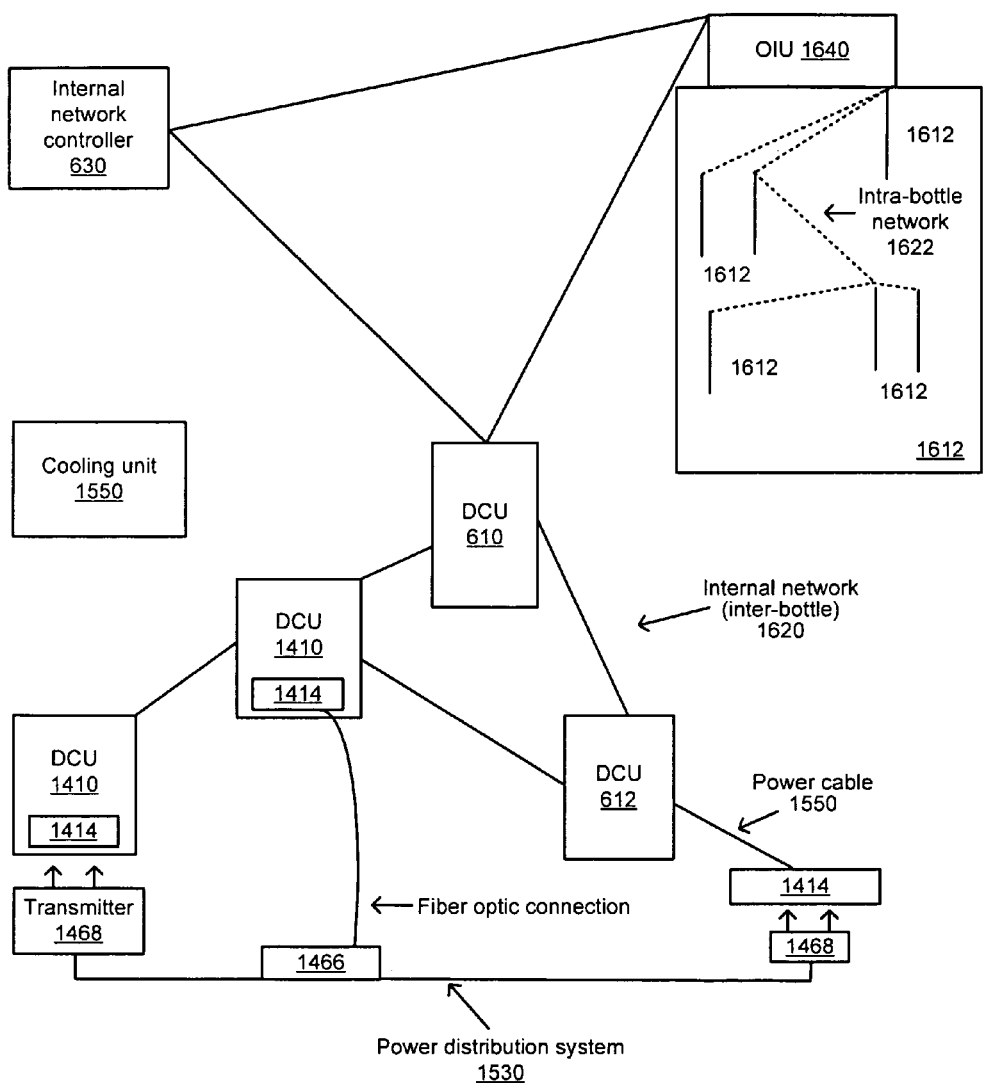
FIG. 16 is a block diagram illustrating an exemplary data center deploying one or more bottles having data processing units, an inter-bottle network of free space optical communication links between the bottles, and an intra-bottle network of communication links between the data processing units, in accordance with the principles of the solutions described herein.

FIG. 16 shows another exemplary data center 1600. Data center 1600 may include a one or more bottles 1610 each of which may have one or more data processing units (DPUs) 1612 (e.g., electronic modules, boxes, servers, cards, boards, and/or racks or free standing assemblies thereof). Each DPU may be configured to run a part or all of a data processing application. Data center 1600 may also deploy other types of data center units (e.g., DCUs 110, 610, 710, 1110, and 1410).

At least one bottle 1610 may have an optical interface unit (OIU) 1640. OIU 1640, like OIU 120, may be configured to connect or disconnect the bottle (e.g., in response to optical control signals) to or from an inter-bottle network 1620 of one or more free space optical communication links between the plurality of bottles or DCUs in the data center. The links may be preset or dynamically established during data center operation. The links may include one or more unipolar, bipolar, multi-polar, and/or pass-through optical links between the plurality of bottles. Data center 1600 may include a light-absorbing gas or fluid arranged to dampen light propagation beyond a connection point or node in inter-bottle network 1620.

OIU 1640 may include suitable mechanically and/or electrically steerable optical elements configured to steer a light beam in a select direction. An inter-bottle network controller (e.g. network controller 630) coupled to OIU 1640 to supervise its operations to connect or disconnect the bottle to inter-bottle network 1620. Data center 1600 may include a beacon assembly or other location-indicating device configured to locate a connection point for OIU 1640. OIU 1640 may be configured to be responsive to the locating beacon to connect to connect the bottle to inter-bottle network 1620 of one or more free space optical communication links.

Conversely, one or more data processing units (DPUs) 1612 in a bottle 1610 may be communicatively linked by an intra-bottle network 1622, which is optically decoupled from the inter-bottle network 1620. Intra-bottle network 1622 may include any suitable links between DPUs 1612 in the bottle. The links may, for example, include, hardwired electrical, RF, microwave, fiber optic and/or free space optical links. In the case of fiber optic and/or free space optical links, inter-bottle network 1620 and intra-bottle network 1622 may be configured to use different wavelengths for communication.

Inter-bottle network 1620, like internal network 1220, may be configured to support multi-wavelength and/or multi-polarization optical communications over free space optical communication links. Inter-bottle network 1620 may be arranged to include one or more virtual local area networks (LANs) linking respective groups DCUs. The one or more virtual LANs may be assigned respective wavelengths for optical signal transmission. Likewise, a specific data processing application and the DCUs running the specific data processing application may be assigned a designated wavelength for mutual data communications over internal network 1620. The wavelength assignments may be preset or dynamic. A specific DCU may be assigned discrete set of wavelengths for data transmission and/or data receiving over internal network 1620.

Further, inter-bottle network 1620, like internal network 1220, may be arranged in a hierarchy of networks. A hierarchy of diverse networks may, for example, be based on wavelengths and/or spatial diversity. Inter-bottle network 1620 may, for example, include a first network, which is optically isolated from a second network. For this purpose, data center 1600/inter-bottle network 1620 may include receivers that are range and/or direction limited and configured to optically isolate the first network from the second network. The isolated first and second networks may, for example, include an optically isolated wavelength-addressed n×n network, and/or a wavelength-addressed 32×32 network.

One or more DCUs in data center 1600 may be associated with respective identifying-wavelengths and/or signal polarities, and the DCUs may be configured to broadcast optical control and/or data signals at their respective identifying-wavelengths and/or signal polarities. Conversely, a DCU's optical receiver may be configured to identify a sending DCU by the identifying-wavelength and/or signal polarity of the optical control and/or data signals broadcast by the sending DCU.

Further, one or more DCUs in data center 1600 may be configured to broadcast free space optical control/and or data signals. A DCU may be configured to broadcast a free space optical control/and or data signal in which an intended recipient is designated by a respective transmit time slot in the signal. Conversely, a DCU's optical receiver may be configured to recognize that it is the intended recipient of the free space optical control/and or data signal broadcast by recognizing its respective transmit time slot in the signal. Further, a multiplicity of DCUs may be associated with a respective combination of identifying-wavelengths and/or time slots, and configured to broadcast optical control and/or data signals with their respective combination of identifying-wavelengths and time slots. Conversely, a DCU's optical receiver may be configured to identify a sending DCU by recognizing the sending DCU's respective combination of the identifying-wavelengths and/or time slots.

The multiplicity of DCUs associated with respective identifying-wavelengths, may be configured to simultaneously broadcast optical control and/or data signals at the DCUs respective identifying-wavelengths over one or more free space optical communication links. Conversely, a DCU's optical receiver may be configured to wavelength-demultiplex and optionally buffer a received optical control and/or data signal. For this purpose, the DCU's optical receiver may include suitable demultiplexing circuitry, (e.g., an array of photodiodes operating at different wavelengths) and a buffer for the wavelength-demultiplexed signals.

Figure 17:
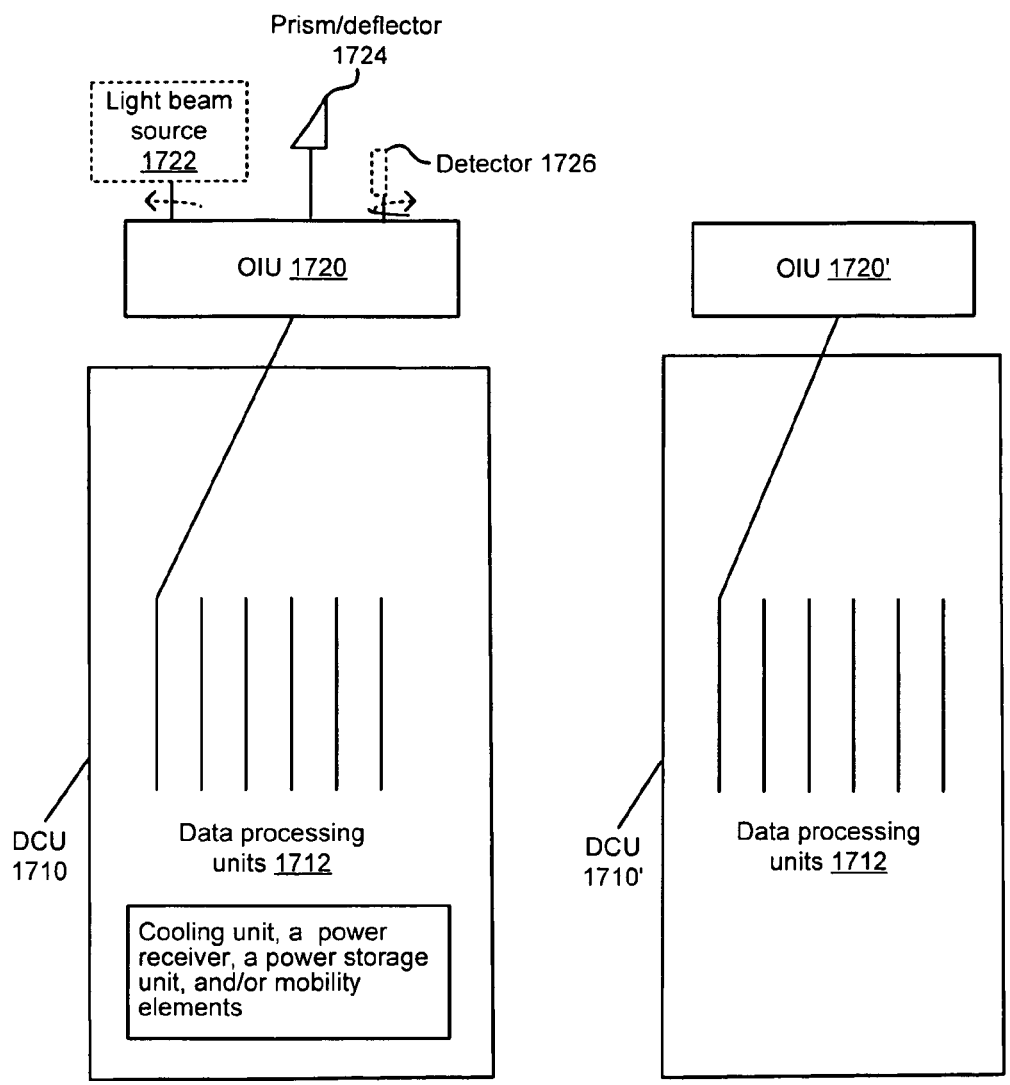
FIG. 17 is a block diagram illustrating exemplary data center units having optical interface units that include independently steerable light transmitting elements, independently steerable light redirecting elements, independently steerable light receiving elements, and/or electro-optical steering elements for communications over the free space optical communication links, in accordance with the principles of the solutions described herein.

FIG. 17 shows exemplary data center bottles 1710 and 1710'. Data center bottles 1710 and 1710' each include one or more data processing units 1712 that are configured to run a part or all of a data processing application. Each data processing unit 1712 may include one or more data processing circuits (e.g., electronic modules, boxes, servers, cards, boards, and/or racks or free standing assemblies thereof).

Further, data center bottles 1710 and 1710' include optical interface units (OIU) 1720 and 1720', respectively. Each of the OIUs is coupled to one or more DPUs 1712 in the respective bottles. OIUs 1720 and 1720', like OIU 120, may include suitable optical elements (e.g., opto-mechanical, opto-acoustic and/or opto-electric transducers responsive to optical signal control, a light beam transmitter, pass-through device, and/or a receiver, an optical beam generator, a beam-forming circuitry, an optical signal receiver/detector, and/or an optical-to-electrical signal converter, a reflecting mirror, and/or a hemispherical lens) to connect or disconnect the data center bottle to or from a network of optical communication links, for example, under free space optical signal control. OIUs 1720 and 1720' may be configured to be responsive to a beacon assembly or other location-indicating device configured to locate a connection point to connect the bottle to an network of one or more free space optical communication links.

An exemplary OIU 1720 includes one or more independently steerable light transmitting elements 1722, independently steerable light redirecting elements 1724, and/or independently steerable light receiving elements 1726 for transmitting, redirecting, and/or receiving communications over free space optical communication links. The independently steerable elements may, for example, be mechanically, or electro-mechanically steerable elements.

An exemplary OIU 1720' may, additionally or alternatively, include one or more electrooptically steerable elements for transmitting, redirecting, and/or receiving communications over the free space optical communication links. The electro optically steerable elements may include non-mechanical beam steering devices (e.g., electro-optic effect devices, liquid crystal devices, variable blaze approach devices, multiplexed volume holography devices, birefringent prisms devices, circularly polarized liquid crystal birefringent polarization gratings. etc.). The exemplary electro optically steerable elements may include devices of the type that are described, for example, in McManamon et al., Review of Phased Array Steering for Narrow-Band Electrooptical Systems, Proceedings of the IEEE, Vol. 97, No. 6, June 2009, pp. 1079-1096.

Data center bottles 1710 and 1710' may be configured to be deployed in a data center having an internal network of one or more free space optical communication links between a plurality of nodal points distributed across the data center. Data center bottles 1710 and/or 1710' may include beacons configured to indicate locations of the bottles. Data center bottles 1710 and/or 1710' may further include suitable control circuitry configured to supervise operations of OIU 1720 and OIU 1720', respectively, and/or to supervise operations additional data processing unit components (e.g., a cooling unit, a wireless, microwave and/or optical power receiver, a power storage unit, mobility elements configured to move the data center bottle from a first position to a second position in the data center).

Figure 18:
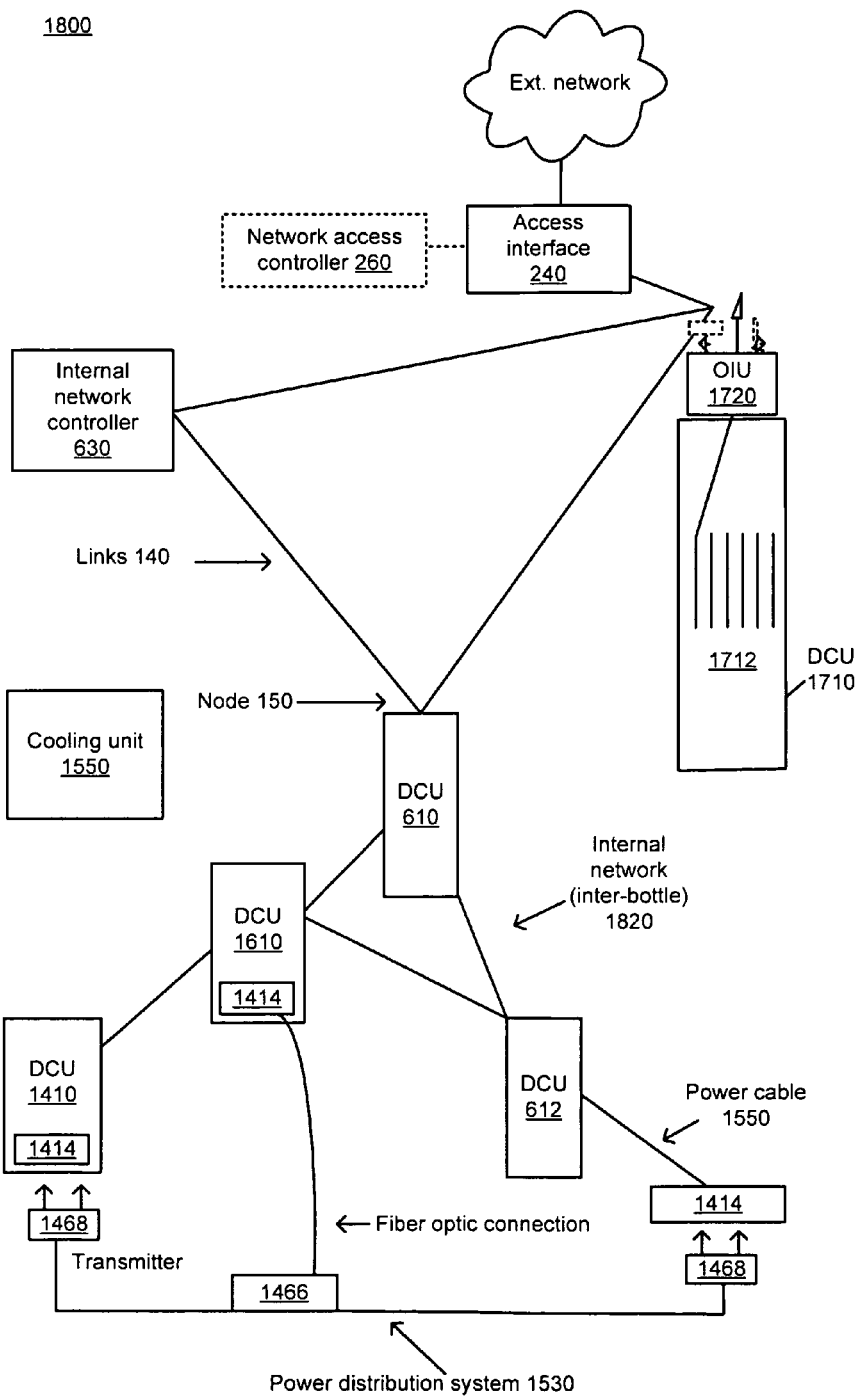
FIG. 18 is a block diagram illustrating an exemplary data center deploying one or more of the data center units of FIG. 17, in accordance with the principles of the solutions described herein.
Figure 22:
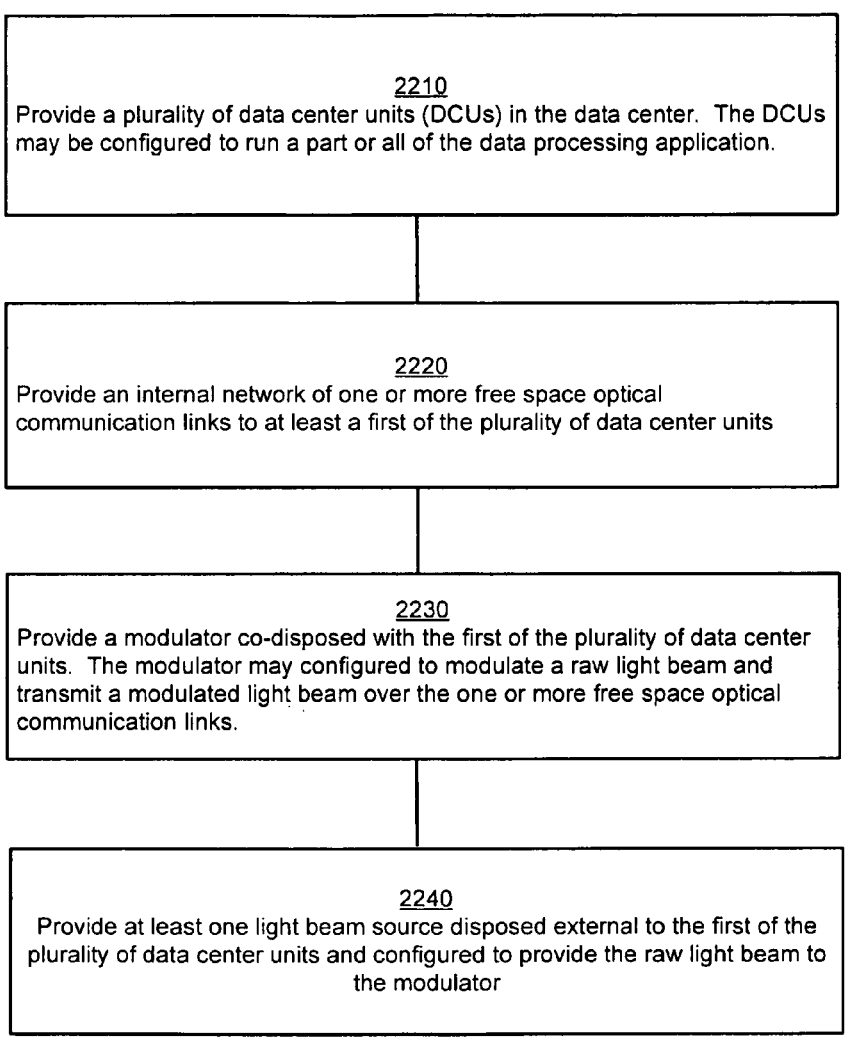
Figure 25:
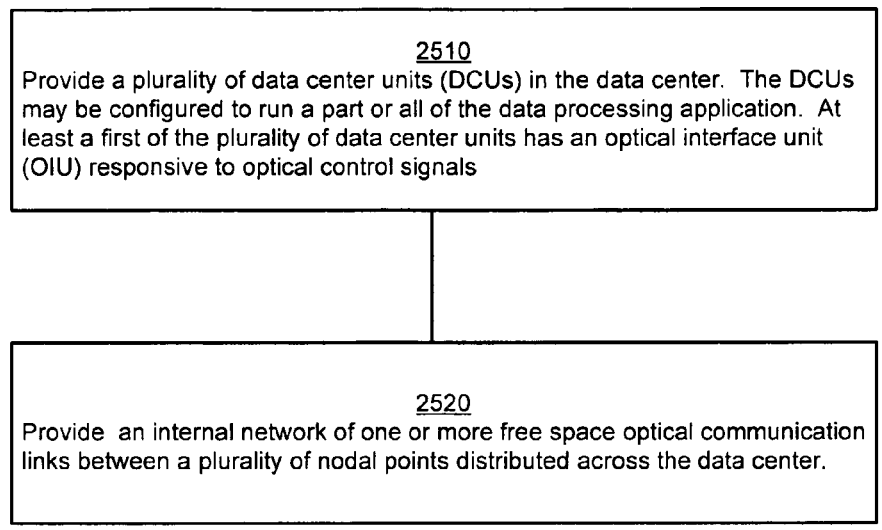
Figure 26:
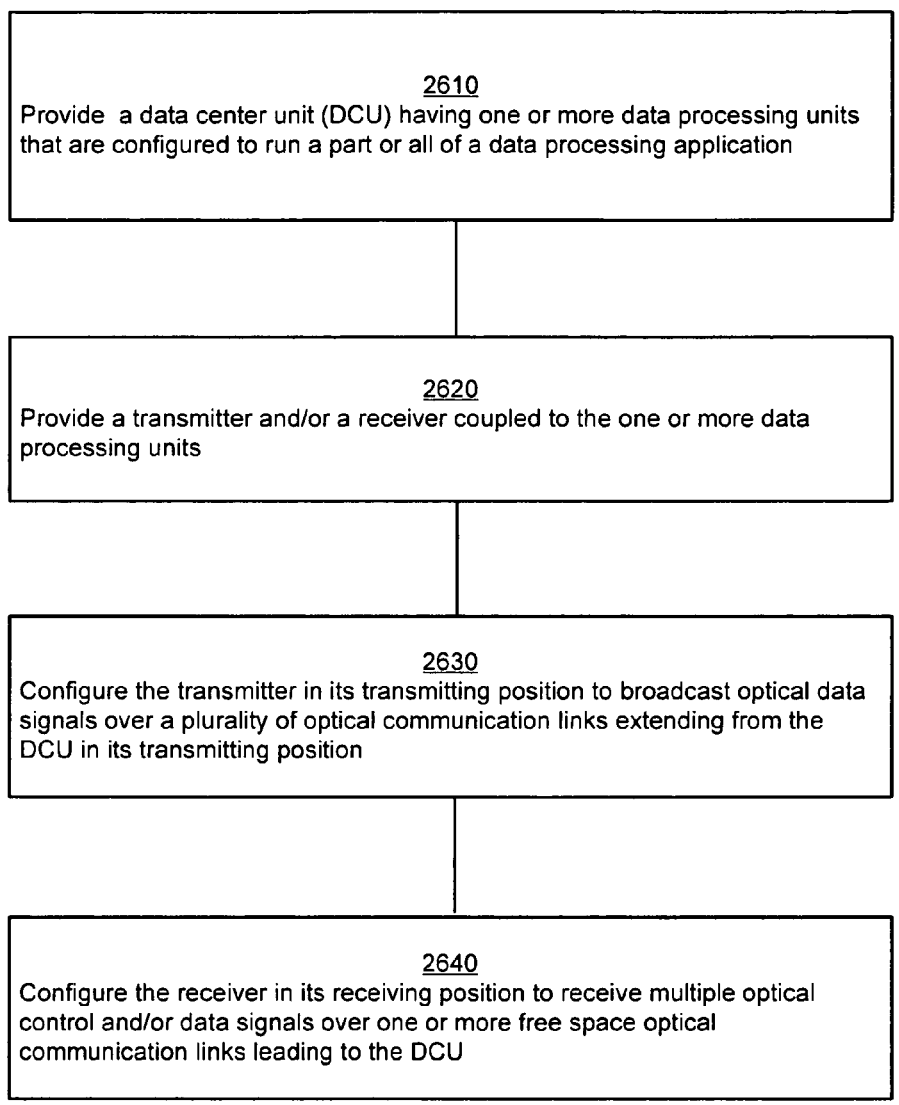
Figure 28:
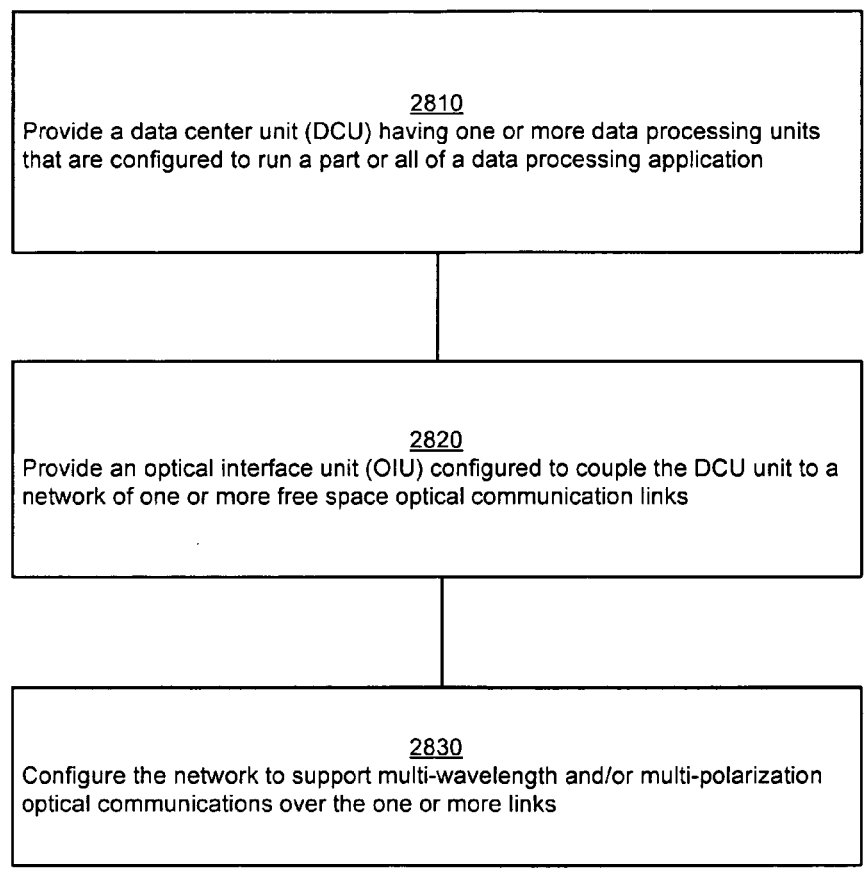
Figure 29:
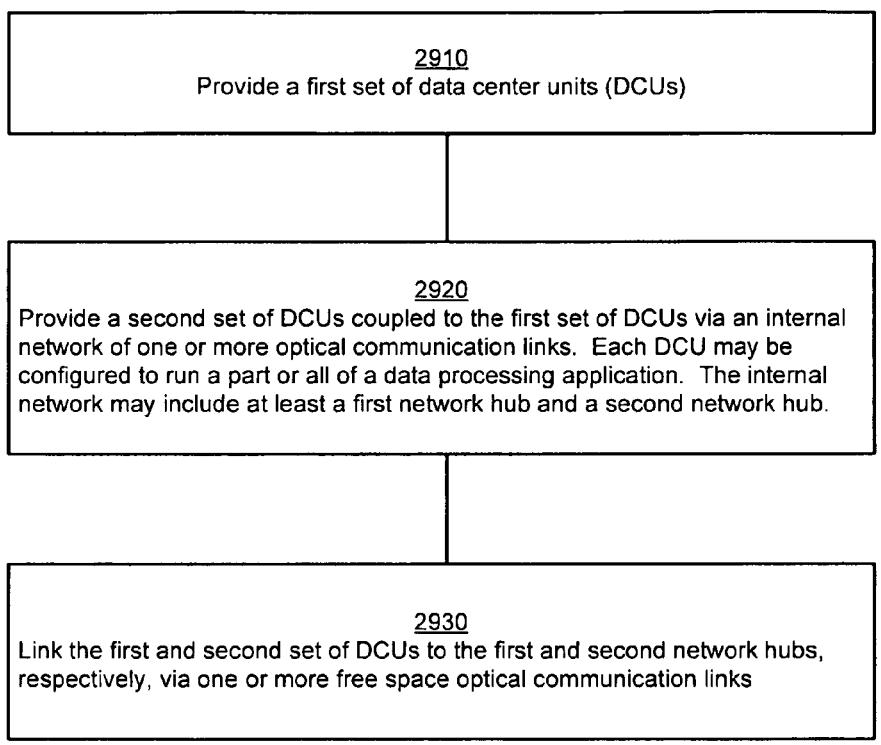
Figure 30:
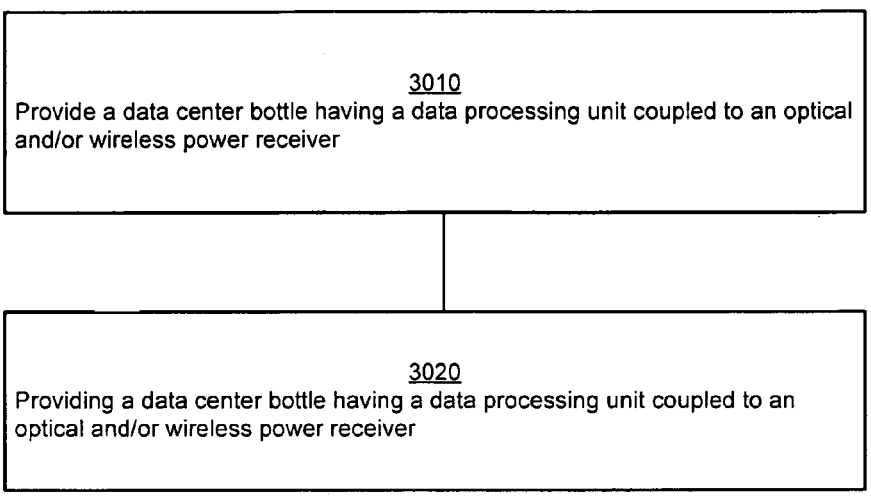

FIG. 18 shows another exemplary data center 1800. Data center 1800 may include one or more bottles 1710 and/or 1710' having respective optical interface units (e.g., OIU 1720 or 1720'). OIU 1720 may include one or more independently steerable light transmitting elements, independently steerable light redirecting elements, independently steerable light receiving elements and/or for communications over the free space optical communication links. OIU 1720' may, additionally or alternatively, include one or more electrooptically steerable elements for transmitting, redirecting, and/or receiving communications over the free space optical communication links. Data center 1800 may also deploy other types of data center units (e.g., DCUs 110, 610, 612, 710, 1110, and 1410).

Each DCU or bottle in data center 1800 may have one or more data processing units (DPUs) or data processing circuits (e.g., electronic modules, boxes, servers, cards, boards, and/or racks or free standing assemblies thereof). Each DPU may be configured to run a part or all of a data processing application. One or more DCUs in data center 1800 may have a wireless and/or optical power receiver, and/or a cooling unit. Like in data center 800, one or more DCUs in data center 1800 may have a modulator co-disposed with a DCU. The modulator (e.g., modulator 720) may be configured to modulate a raw light beam and transmit a modulated light beam over one or more free space optical communication links. Data center 1800 may include a light beam source (e.g., source 730)

disposed external to the DCU and configured to provide the raw light beam to the modulator. The plurality of DCUs in data center 1800 may be electrically disjoint and in communication only optically (or wirelessly).

At least one bottle in data center 1800 has an optical interface unit (e.g., OIU 1720, OIU 1720'), which like OIU 120, may be configured to connect or disconnect the bottle (e.g., in response to optical control signals) to or from an inter-bottle network 1820 of one or more free space optical communication links between the plurality of bottles or DCUs in the data center. The links may be preset or dynamically established during data center operation. The links may include one or more unipolar, bipolar, multi-polar, and/or pass-through optical links between the plurality of bottles. Data center 1800 may include a light-absorbing gas or fluid arranged to dampen light propagation beyond a connection point or node in inter-bottle network 1820.

The optical interface unit (e.g., OIU 1720 and OIU 1720') may include suitable mechanically and/or electrically steerable optical elements configured to steer a light beam in a select direction. An inter-bottle network controller (e.g. network controller 630) may be coupled to the optical interface unit to supervise its operations to connect or disconnect the bottle to inter-bottle network 1820. Data center 1800 may include a beacon assembly or other location-indicating device configured to locate a connection point for the optical interface unit. The optical interface may be configured to be responsive to the locating beacon to connect to connect the bottle to inter-bottle network 1820 of one or more free space optical communication links.

Internal network 1820, like internal network 1220, may be configured to support multi-wavelength and/or multi-polarization optical communications over free space optical communication links. Internal network 1820 may be arranged to include one or more virtual local area networks (LANs) linking respective groups DCUs. The one or more virtual LANs may be assigned respective wavelengths for optical signal transmission. Likewise, a specific data processing application and the DCUs running the specific data processing application may be assigned a designated wavelength for mutual data communications over internal network 1820. The wavelength assignments may be preset or dynamic. A specific DCU may be assigned discrete set of wavelengths for data transmission and/or data receiving over internal network 1820.

The optical communication links 140 in internal network 1820 may be arranged in a bus, a star, a ring and/or a hybrid topology. Further, internal network 1820, like internal network 1220, may be arranged in a hierarchy of networks. Internal network 1820 may, for example, have links arranged between a DCU and its proximate or nearest neighbors. An hierarchy of diverse networks may, for example, be based on wavelengths and/or spatial diversity. Internal network 1820, like internal network 1320, may include one or more central hubs and/or sub-hubs, and include one or more links between the central hubs, sub-hubs, and/or DCUs. The central hubs and/or sub-hubs may include routing holograms. Internal network 1820 may, for example, include a first network, which is optically isolated from a second network. For this purpose, data center 1800/internal network 1820 may include receivers that are range and/or direction limited and configured to optically isolate the first network from the second network. The isolated first and second networks may, for example, include an optically isolated wavelength-addressed n×n network, and/or a wavelength-addressed 32×32 network.

One or more DCUs in data center 1800 may be associated with respective identifying-wavelengths and/or signal polarities, and the DCUs may be configured to broadcast optical control and/or data signals at their respective identifying-wavelengths and/or signal polarities. Conversely, an optical receiver in data center 1800 may be configured to identify a sending DCU by the identifying-wavelength and/or signal polarity of the optical control and/or data signals broadcast by the sending DCU.

Further, one or more DCUs in data center 1800 may be configured to broadcast free space optical control/and or data signals. A DCU may be configured to broadcast a free space optical control/and or data signal in which an intended recipient is designated by a respective transmit time slot in the signal. Conversely, an optical receiver in data center 1800 may be configured to recognize that it is the intended recipient of the free space optical control/and or data signal broadcast by recognizing its respective transmit time slot in the signal. Further, a multiplicity of DCUs may be associated with a respective combination of identifying-wavelengths and/or time slots, and configured to broadcast optical control and/or data signals with their respective combination of identifying-wavelengths and time slots. Conversely, a DCU's optical receiver may be configured to identify a sending DCU by recognizing the sending DCU's respective combination of the identifying-wavelengths and/or time slots.

The multiplicity of DCUs associated with respective identifying-wavelengths, may be configured to simultaneously broadcast optical control and/or data signals at the DCUs respective identifying-wavelengths over one or more free space optical communication links. Conversely, an optical receiver in data center 1800 may be configured to wavelength-demultiplex and optionally buffer a received optical control and/or data signal. For this purpose, the optical receiver may include suitable demultiplexing circuitry, (e.g., an array of photodiodes operating at different wavelengths) and a buffer for the wavelength-demultiplexed signals.

Like in network 220, one or more nodal points 150 in internal network 1820 may be associated with individual DCUs in data center 1800. At least one nodal point 150 may correspond to a DCU's OIU. Further, at least one nodal point 150 may be external to the plurality of DCUs in data center 1800. For example, a nodal point 150 may be associated with network controller 630. Another nodal point 150 may be associated with an external network access interface (e.g., interface 250), which provides external network access to data center 1800. The one or more free space optical communication links across data center 1800 may include a nodal point-to-nodal point link and/or a nodal point-to-multinodal point link.

Each nodal point 150 in internal network 1820 may include passive or active optical structures or elements that are configurable to establish the one or more free space optical communication links 140. The optical structures or elements may, for example, include one or more of a reflecting mirror, a steerable telescope, a hemispherical lens, an optical router, an electro-optical beam steering element, and/or a mechanically steerable optical element.

The one or more nodal points 150, which may be interposed at locations remote to the DCUs 110, may include a reconfigurable nodal point. Like OIUs 120, 1720, and 1720', the reconfigurable nodal point may include a passive or an active optical arrangement 510 of one or more optical elements (e.g., a mirror, a steerable mirror, a receiver, a transmitter, and/or a receiver-transmitter). FIG. 5 shows optical arrangements 510 disposed in a data center. The optical elements in arrangement 510 (e.g., a fixed or steerable mirror disposed at any one of a data center region wall, ceiling, floor, and/or boundary) may be configured to redirect an optical beam incident from a first nodal point 150 in the network 1820 to one or more other nodal points 150. The optical elements may include an arrangement of discrete mirrors and/or reflectors configured to redirect light from a first nodal point to a second nodal point in the internal network. The discrete mirrors and/or reflectors may be optically steerable.

Data center 1800 may further include a router (e.g., a passive router, an active router, a mirror assembly, a holographic reflector, an optical switch and/or a receiver/transmitter with electronic switching) configured to route data between the data center units over the one or more free space optical communication links in network 1820.

In general, internal network 1820 of one or more free space optical links may include an optical arrangement configured to redirect light from a first nodal point to a second nodal point in the internal network. The optical arrangement may include an arrangement of discrete mirrors, diffractive elements, and/or reflectors configured to redirect light from a first nodal point to a second nodal point in the internal network. The optical arrangement may, for example, include a mirror disposed at any one of a data center region wall, ceiling, floor, and/or boundary, and/or an arrangement of discrete mirrors and/or reflectors (e.g., optically steerable elements) configured to redirect light from a first nodal point to a second nodal point in the internal network. The optical arrangement may also include structures, blockers, screens and/or baffles to block stray light.

Likewise, the external network access interface (e.g., interface 240), which provides external network access to data center data center may include one or more optical elements (e.g., a reflecting mirror, a steerable telescope and/or a hemispherical lens, an electro-optical beam steering element and/or a mechanically steerable optical element) configured to link an external network to the internal network of the one or more free space optical communication links.

The inter-bottle network controller (e.g. network controller 630) in data center 1800 may be configured to establish a dynamic link during data center operations using a search or scanning process. The dynamic link may be established, for example, in response to a data center process value and/or an external process value or command.

Like data center 500, data center 1800 may also include a cooling arrangement 1550 coupled to one or more of the DCUs disposed in data center 1800. Cooling arrangement 1550 may be based on a spray, blown air/gas, and/or a LN2 coolant.

FIGS. 19-36 show exemplary methods 1900-2800 for executing a data processing application in a data center or server farm. In particular, methods 1900-2800 provide data center devices and environments for executing a data processing application.

Method 1900 for executing a data processing application in a data center or server farm includes providing one or more data center bottles in the data center (1910). Each data center bottle may have a plurality of data processing units (DPUs) configured to run a part or all of the data processing application (1910). The plurality of DPUS may be linked to an optical interface unit which is configured to, under free space optical signal control, connect the data center bottle to an network of one or more free space optical communication links. Method 1900 further includes providing an internal network of one or more free space optical communication links between a plurality of nodal points distributed across the data center (1920).

Method 2000 for executing a data processing application in a data center or server farm includes providing one or more data center units (DCUs) in the data center (2010). The DCUs may be configured to run a part or all of the data processing application. At least a first of the plurality of data center units has an optical interface unit (OIU) responsive to optical control signals. Method 2000 further includes providing an internal network of one or more free space optical control and/or data communication links between nodal points associated with individual DCUs across the data center (2020); and providing a network controller configured to connect or disconnect the plurality of data center units from the internal network (2030).

Method 2100 for executing a data processing application in a data center or server farm includes providing one or more data center units (DCUs) in the data center (2110). The DCUs may be configured to run a part or all of the data processing application. At least one of the DCUs may be a mobile DCU movable between a first and a second location in the data center. Method 2100 further includes providing a reconfigurable internal network of one or more free space optical communication links inter-linking of one or more of the plurality of DCUs (2120); and providing an internal network controller configured to control inter-linking of one or more of the plurality of DCUs including the mobile DCU at its first and second locations to the reconfigurable internal network (2130).

Method 2200 for executing a data processing application in a data center or server farm includes providing one or more data center units (DCUs) in the data center (2210). The DCUs may be configured to run a part or all of the data processing application. Method 2200 further includes providing an internal network of one or more free space optical communication links to at least a first of the plurality of data center units (2220); providing a modulator co-disposed with the first of the plurality of data center units in the region (2230). The modulator may be configured to modulate a raw light beam and transmit a modulated light beam over the one or more free space optical communication links. Method 2200 also includes providing at least one light beam source disposed external to the first of the plurality of data center units and configured to provide the raw light beam to the modulator (2240).

Method 2300 for executing a data processing application in a data center or server farm includes providing one or more data center units (DCUs) in the data center (2310); and, providing a modulator co-disposed with the first of the plurality of data center units (2320). Each DCU may be configured to run a part or all of a data processing application is configured and to be connected to other devices via a network of one or more free space optical communication links. The modulator may be configured to modulate a raw light beam and transmit a modulated light beam over the one or more free space optical communication links. (DCU version) A method comprising:

Method 2400 for executing a data processing application in a data center or server farm includes providing one or more data center units (DCUs) in the data center (2410), and configuring at least one of the plurality of DCUs to broadcast optical control and/or data signals in the region over an internal network of one or more free space optical communication links (2420).

Method 2500 for executing a data processing application in a data center or server farm includes providing one or more data center units (DCUs) in the data center at least one of which has an optical receiver (2510); and configuring the optical receiver in its receiving position to receive multiple optical control and/or data signals over a one or more free space optical communication links leading to the at least one DCU (2520).

Method 2600 for executing a data processing application in a data center or server farm includes providing a data center unit (DCU) having one or more data processing units that are configured to run a part or all of a data processing application (2610). Method 2600 further includes providing a transmitter and/or a receiver coupled to the one or more data processing units (2620); configuring the transmitter in its transmitting position to broadcast optical data signals over a plurality of optical communication links extending from the DCU in its transmitting position (2630); and configuring the receiver in its receiving position to receive multiple optical control and/or data signals over one or more free space optical communication links leading to the DCU (2640).

Method 2700 for executing a data processing application in a data center or server farm includes providing a plurality of data center units (DCUs) in the data center (2710). Each DCU may be configured to run a part or all of one or more data processing applications, and one of more of the DCUs may be coupled to an internal network of one or more free space optical communication links between the DCUs. Method 2700 further includes configuring the internal network to support multi-wavelength and/or multi-polarization optical communications over the links (2720).

Method 2800 for executing a data processing application in a data center or server farm includes providing a data center unit (DCU) having one or more data processing units that are configured to run a part or all of a data processing application (2810); providing an optical interface unit (OIU) configured to couple the DCU unit to a network of one or more free space optical communication links (2820); and configuring the network to support multi-wavelength and/or multi-polarization optical communications over the one or more links (2830).

Method 2900 for executing a data processing application in a data center or server farm includes providing a first set of data center units (DCUs) (2910); and, providing a second set of DCUs coupled to the first set of DCUs via an internal network of one or more optical communication links (2920). Each DCU may be configured to run a part or all of a data processing application. The internal network may include at least a first network hub and a second network hub. Method 2900 further includes linking the first and second set of DCUs are linked to the first and second network hubs, respectively, via one or more free space optical communication links (2930).

Method 3000 for executing a data processing application in a data center or server farm includes providing a data center bottle having a data processing unit coupled to an optical and/or wireless power receiver (3010); and, providing a data center bottle having a data processing unit coupled to an optical and/or wireless power receiver (3020).

Method 3100 for executing a data processing application in a data center or server farm includes providing a plurality of data center units (DCUs) disposed in a data center (3110). Each DCU may be configured to run a part or all of a data processing application. Method 3100 further includes providing a power distribution system configured to distribute optical and/or wireless power to the plurality of data center units disposed in the region. At least a first of the plurality of data center units may be configured to run its part or all of the data processing application using optical and/or wireless power received via the power distribution system (3120).

Method 3200 for executing a data processing application in a data center or server farm includes providing a plurality of bottles in a data center, wherein each bottle has one or more data processing units (DPUs) configured to run a part or all of a data processing application (3210); providing at least a first of the plurality of bottles with an optical interface unit (OIU) configured to connect or disconnect the first bottle to or from an inter-bottle network of one or more free space optical communication links between the plurality of bottles (3220); and, linking the one or more data processing units (DPUs) in the first bottle communicatively by an intra-bottle network which is optically decoupled from the inter-bottle network (3230).

Method 3300 for executing a data processing application in a data center or server farm includes providing a data center unit (DCU) having one or more data processing units (DPUs) that are configured to run a part or all of a data processing application (3310); and providing an optical interface unit (OIU) coupled to the one or more DPUs (3320). The OIU may be configured to couple the DCU to a network of one or more free space optical communication links. Further, the OIU may include one or more independently steerable light transmitting elements, independently steerable light redirecting elements, and/or independently steerable light receiving elements for communications over the free space optical communication links.

Method 3400 for executing a data processing application in a data center or server farm includes providing a plurality of data center units (DCUs) disposed in a data center (3410); and providing an optical interface unit (OIU) coupled to the one or more DCUs (3420). Each DCU may be configured to run a part or all of a data processing application. The OIU may be configured to couple a DCU to an internal network of one or more free space optical communication links. Further, the OIU may include one or more independently steerable transmitting elements, independently steerable redirecting elements, and/or independently steerable receiving elements for communications over free space optical communication links. Method 3400 further includes steering the independently steerable elements of the OIU to establish free space optical communication links (3430).

Method 3500 for executing a data processing application in a data center or server farm includes providing a data center unit (DCU) having one or more data processing units that are configured to run a part or all of a data processing application (3510); and providing an optical interface unit (OIU) coupled to the one or more data processing units (3520). The OIU may be configured to connect the DCU unit to a network of one or more free space optical communication links. Further, the OIU may include one or more electrooptically steerable elements for transmitting, redirecting, and/or receiving communications over the free space optical communication links.

Method 3600 for executing a data processing application in a data center or server farm includes providing a plurality of data center units (DCUs) disposed in a data center (3610). Each DCU may be configured to run a part or all of a data processing application. Method 3600 may further include providing an optical interface unit (OIU) coupled to the one or more DCUs (3620). The OIU may be configured to couple the DCU to an internal network of one or more free space optical communication links. Further, the OIU may include one or more electrooptically steerable elements for transmitting, redirecting, and/or receiving communications over the free space optical communication links. Method 3400 also includes steering the electrooptically steerable elements for transmitting, redirecting, and/or receiving communications over the free space optical communication links (3630).

Methods 1900-3600 may all provide or involve data center components (e.g., bottles, units or processing units or circuitry) including stationary or mobile components for processing a part or all of the data processing application. The data center components may include one or more of electronic modules, boxes, servers, cards, boards, and/or racks or free standing assemblies thereof. One or all of methods 1900-3600 may further include providing other data center components (e.g., a cooling unit, a wireless and/or optical power receiver, a power storage unit and/or a beacon or other device configured to indicate a location of a data center component, an external access interface/controller, optical interface unit/network controller, a router, etc.) that may be the same or similar to those described herein with reference to FIGS. 1-18. Further, methods 1900-3600 may all provide or involve internal networks of optical links for communications between various data center bottles, units, or other components. The internal networks may involve free space optical communication links between a plurality of nodal points distributed across the data center. The internal networks provided by or involved in the methods may have features that are the same or similar to the features of the internal networks (including the inter- and intra-bottle networks described herein with reference to FIGS. 1-18.

It will be understood that the free space optical communication links between a plurality of nodal points distributed across the data centers (e.g., described herein with reference to FIGS. 1-18) may be preset or may be dynamically established during data center operations. Exemplary method 3700 for executing a data processing application in a data center or server farm may all provide or involve internal networks of optical links for communications between various data center bottles, units, or other components. Method 3700 includes providing a plurality of data center units (DCUs) disposed in a data center (3710). Each DCU may be configured to run a part or all of a data processing application. Method 3700 may further include dynamically predicting, while the data processing application is running, a future communication need between a first DCU and a second DCU running part or all of the data processing application (3720). Predicting a communication need may involve predicting a start time ($t_s$) and/or an end time ($t_e$) of such need. Method 3700 includes establishing one or more free space optical communication links to meet the predicted or anticipated communication need between the first DCU and the second DCU running part or all of the data processing application (3730) before the predicted start time $t_s$ of the communication need. The links may be disconnected or discontinued after a predicted (or actual) end time $t_e$ of the communication need.

Further, establishing the one or more free space optical communication links between the first DCU and the second DCU may involve activation of optical interface units associated with the DCUs to enable transmission and/or reception of free-space optical communication signals between the two DCUs. Such activation of the optical interface units may, for example, involve alignment of physical optics and/or light beams. The activation of the optical interface units to enable transmission and/or reception of free-space optical communication signals between the two DCUs may further, for example, include turning on or otherwise making light sources, laser beams, amplifiers, switches, modulators, detectors, receivers, and/or other components involved in transmission, reception, and/or detection free-space optical communication signals operationally available.

Figure 38:
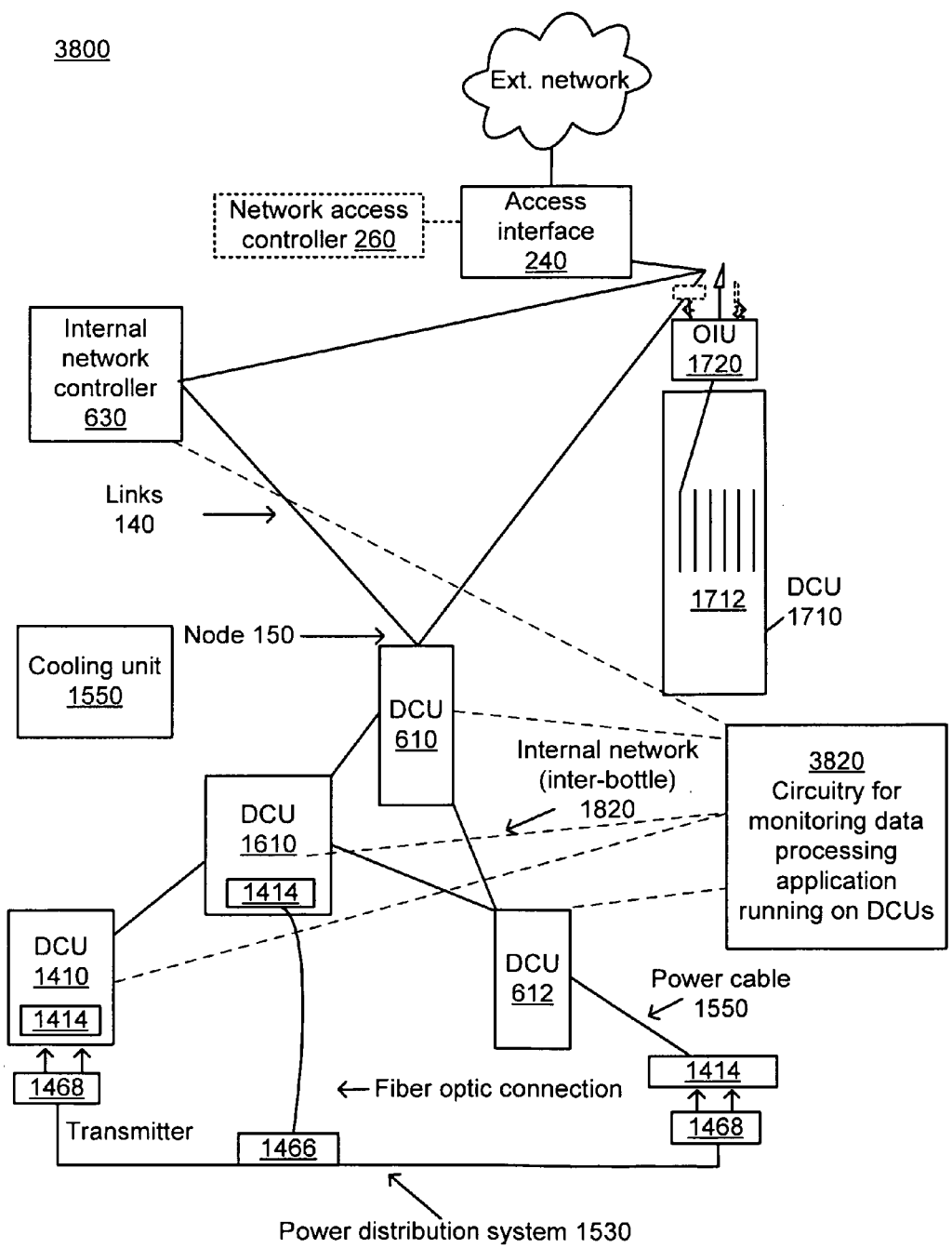
FIG. 38 is a block diagram illustrating an exemplary data center deploying circuitry to predict or anticipate communication needs between one or more DCUs in the execution of a data processing application in the data center, and a network controller that is configured to dynamically establish free space optical links between the one or more DCUs to meet the predicted or anticipated communication needs, in accordance with the principles of the solutions described herein.

With reference to FIG. 38, the data centers (e.g., data center 3800) may include suitable circuitry for estimating or monitoring the execution of a data processing application in parallel or in series on one or more DCUs in a data center. Such circuitry (e.g., circuitry 3820) may be configured to dynamically predict or anticipate a communication need between the first DCU and the second DCU while part or all of the data processing application is running in series and/or in parallel on the DCUs. A network controller (e.g., controller 630), which is coupled to the estimating or monitoring circuitry, may be configured to dynamically establish a free space optical communication link between the first DCU and the second DCU in anticipation of the predicted communication need. The network controller may establish a free space optical communication link, for example, by aligning physical optics and/or light beams, or by activating and making operationally available components (e.g., light sources, laser beams, amplifiers, switches, modulators, detectors, receivers, and/or other components) that may be involved in transmission, reception, and/or detection free-space optical communication signals. The network controller may be further configured to disconnect or discontinue the link once the predicted communication need is over.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:
1. A data center comprising:
a plurality of data center units (DCUs) disposed in a region, wherein each DCU is configured to run a part or all of a data processing application; and a number M of broadcasting transmitters (M>1) and a number N of optical receivers (N>1) associated with the plurality of DCUs disposed in the region, wherein each of the M broadcasting transmitters is configured to broadcast optical control and/or data signals to the each of the N optical receivers over an internal network of separate free space optical communication links that form M×N distinct communication channels between pairs of the M broadcasting transmitters and the N optical receivers in the region, wherein each of the M×N distinct communication channels between pairs of the M broadcasting transmitters and the N optical receivers in the region is associated with a distinct channel-identifying characteristic, and wherein each of the N optical receivers is configured to identify a broadcasting transmitter by the channel-identifying characteristic of the communication channel between the broadcasting transmitter and the optical receiver.

2. The data center of claim 1, wherein the transmitter and receiver associated with each communication channel are respectively configured to transmit and receive optical control and/or data signals having the distinct channel-identifying characteristic.

3. The data center of claim 1, wherein the distinct channel-identifying characteristic comprises one or more of a channel-identifying wavelength, polarization, time-slots, header, and/or combination thereof.

4. The data center of claim 1, wherein each of the M broadcasting transmitters is configured to broadcast optical control and/or data signals simultaneously and/or sequentially to the N optical receivers.

5. The data center of claim 1, wherein the internal network includes one or more nodes associated with individual DCUs and/or one or more nodes interposed between the DCUs.

6. The data center of claim 1, wherein at least a first of the plurality of DCUs includes an optical interface unit (OIU) configured to connect the first DCU to the internal network in response to a free space optical control signal.

7. The data center of claim 1, wherein one or more of the M broadcasting transmitters are associated with respective identifying-wavelengths, and each of the one or more of the M broadcasting transmitters is configured to broadcast optical control and/or data signals at its respective identifying-wavelength.

8. The data center of claim 7, wherein one or more of the N optical receivers are configured to identify a broadcasting transmitter by the identifying-wavelength of the optical control and/or data signals broadcast by the broadcasting transmitter.

9. The data center of claim 1, wherein a first of the plurality of DCUs is configured to broadcast a free space optical control and/or data signal over the internal network at different wavelengths, and wherein an intended recipient is designated by a respective wavelength.

10. The data center of claim 9, wherein a receiving DCU is configured to recognize that it is the intended recipient of a free space optical control and/or data signal broadcast over the internal network by recognizing its respective wavelength signal.

11. The data center of claim 1, wherein one or more of the M broadcasting transmitters are associated with respective signal polarizations and each of the one or more of the M broadcasting transmitters is configured to broadcast optical control and/or data signals at its respective signal polarization.

12. The data center of claim 11, wherein one or more of the N optical receivers are configured to identify a broadcasting transmitter by the polarization of its broadcasted optical control and/or data signals.

13. The data center of claim 1, wherein a first of the plurality of DCUs is configured to broadcast a free space optical control and/or data signal over the internal network at different polarizations, wherein an intended recipient is designated by a respective polarization.

14. The data center of claim 13, wherein a receiving DCU is configured to recognize that it is the intended recipient of a free space optical control and/or data signal broadcast over the internal network by recognizing its respective polarization signal.

15. The data center of claim 1, wherein one or more of the broadcasting transmitters are configured to broadcast optical control and/or data signals over at least a color region (~1% wide frequency region).

16. The data center of claim 15 wherein the color region is a color region at about 1.44, 1.47, or 1.55 microns wavelength.

17. The data center of claim 1, wherein one or more of the broadcasting transmitters are configured to broadcast optical control and/or data signals over two or more color regions.

18. The data center of claim 1, wherein one or more of the M broadcasting transmitters are associated with respective transmitter-identifying characteristics, and wherein each of the one or more of the M broadcasting transmitters are configured to transmit optical control and/or data signals having respective transmitter-identifying characteristics.

19. The data center of claim 18, wherein one or more of the N optical receivers are configured to identify a broadcasting transmitter by recognizing the respective transmitter-identifying characteristics of the optical control and/or data signals broadcast by the broadcasting transmitter.

20. The data center of claim 18, wherein the respective transmitter-identifying characteristics comprise one or more of an identifying wavelength, a polarization, a transmit time slot, a header and/or any combination thereof.

21. The data center of claim 1, wherein a first of the plurality of DCUs is configured to broadcast a free space optical control and/or data signal over the internal network with identifying characteristics, and wherein an intended recipient is designated by a respective combination of identifying characteristics.

22. The data center of claim 21, wherein a receiving DCU is configured to recognize it is the intended recipient of a free space optical control and/or data signal broadcast over the internal network by recognizing its respective combination of the identifying characteristics.

23. The data center of claim 21 wherein the respective identifying characteristics comprise one or more of an identifying wavelength, a polarization, a transmit time slot, a header and/or any combination thereof.

24. The data center of claim 1, wherein a multiplicity of the data center units are associated with respective identifying-wavelengths, wherein the multiplicity of the data center units is configured to simultaneously broadcast optical control and/or data signals at their respective identifying-wavelengths over the internal network, and wherein a receiving DCU comprises a detector configured to wavelength-demultiplex a received optical control and/or data signal.

25. The data center of claim 24, wherein the detector configured to wavelength-demultiplex a received optical control and/or data signal comprises an array of photodiodes operating at different wavelengths.

26. The data center of claim 25, wherein the detector is further configured to buffer the wavelength-demultiplexed signal.

27. The data center of claim 1, wherein the plurality of data center units comprises one or more of data center bottles and/or data processing units, wherein the data center bottles include a plurality of data processing units, wherein the data processing units include one or more data processing circuits, and wherein the data processing circuits include one or more electronic modules, boxes, servers, cards, boards, and/or racks or free standing assemblies thereof.

28. A data center unit (DCU) comprising:
one or more data processing units that are configured to run a part or all of a data processing application; and
a transmitter and/or a receiver coupled to the one or more data processing units, the transmitter having a transmitting position and the receiver having a receiving position, wherein the transmitter in its transmitting position is configured to broadcast optical data signals over a plurality of optical communication links extending from the DCU in its transmitting position, and wherein the receiver in its receiving position is configured to receive multiple optical control and/or data signals over a plurality of free space optical communication links leading to the DCU,
wherein the transmitter in its transmitting position is configured to broadcast optical control and/or data signals having unique DCU-identifying characteristics, and
wherein the receiver in its receiving position is configured to identify a sending DCU by a DCU-identifying characteristic of the optical control and/or data signal broadcast from the sending DCU.

29. The data center unit of claim 28, wherein the DCU-identifying-characteristic is one or more of an identifying-wavelength, signal polarization, transmit time slot, signal header and/or a combination thereof.

30. The data center unit of claim 28, wherein the receiver includes an imaging device, and wherein the receiver is configured to recognize a sending DCU by recognizing an angular direction of a received signal.

31. The data center unit of claim 28, wherein the transmitter in its transmitting position is configured to broadcast optical control and/or data signal so that an intended recipient is designated by a respective recipient-identifying characteristic.

32. The data center unit of claim 31, wherein the receiver in its receiving position is configured to recognize that it is an intended recipient of a free space optical control and/or data signal by recognizing its respective recipient-identifying characteristic.

33. The data center unit of claim 31, wherein the respective recipient-identifying characteristic comprises one or more of a signal wavelength, signal polarization, transmit time slot, header and/or any combination thereof.

34. The data center unit of claim 28, wherein the receiver is configured to wavelength-demultiplex received optical control and/or data signals.

35. The data center unit of claim 34, wherein the receiver configured to wavelength-demultiplex a received optical control and/or data signal comprises an array of photodiodes operating at different wavelengths.

36. The data center unit of claim 34, wherein the receiver is further configured to buffer the wavelength-demultiplexed signal.

37. The data center unit of claim 28, wherein the one or more data processing units are arranged as one or more individual data processing units and/or in one or more groups as data center bottles, wherein the plurality of data processing units include one or more data processing circuits, and wherein the data processing circuits include one or more electronic modules, boxes, servers, cards, boards, and/or racks or free standing assemblies thereof.

38. A method comprising:
providing a plurality of data center units (DCUs) disposed in a region, wherein each DCU is configured to run a part or all of a data processing application; and
providing a number M of broadcasting transmitters M>1 and a number N of optical receivers N>1 associated with the plurality of DCUs disposed in the region, wherein each of the M broadcasting transmitters is configured to broadcast optical control and/or data signals to the each of the N optical receivers over an internal network of separate free space optical communication links that form M×N distinct communication channels between pairs of the M broadcasting transmitters and the N optical receivers in the region,
wherein each of the M×N distinct communication channels between pairs of the M broadcasting transmitters and the N optical receivers in the region is associated with a distinct channel-identifying characteristic, and
wherein each of the N optical receivers is configured to identify a broadcasting transmitter by the channel-identifying characteristic of the communication channel between the broadcasting transmitter and the optical receiver.

39. The method of claim 38, wherein the transmitter and receiver associated with the channel are respectively configured to transmit and receive optical control and/or data signals having the distinct channel-identifying characteristic.

40. The method of claim 38, wherein the distinct channel-identifying characteristic comprises one or more of a distinct channel-identifying wavelength, polarization, time-slots in optical control and/or data signals, header and/or combination thereof.

41. The method of claim 38, wherein each of the M broadcasting transmitters is configured to broadcast optical control and/or data signals simultaneously and/or sequentially to the N optical receivers.

42. The method of claim 38, wherein one or more of the M broadcasting transmitters are associated with respective identifying-characteristic, and each of the one or more of the M broadcasting transmitters is configured to broadcast optical control and/or data signals with its respective identifying characteristic(s).

43. The method of claim 42, wherein one or more of the N optical receivers are configured to identify a broadcasting transmitter by the identifying-characteristic(s) the optical control and/or data signals broadcast by the broadcasting transmitter.

44. The method of claim 42, wherein the identifying-characteristic(s) comprise one or more of an identifying wavelength, polarization, time-slots in optical control and/or data signals, header and/or combination thereof.

45. The method of claim 38, wherein a first of the plurality of DCUs is configured to broadcast a free space optical control and/or data signal over the internal network with different identifying characteristics, wherein an intended recipient is designated by a respective identifying characteristic.

46. The method of claim 45, wherein a receiving DCU is configured to recognize that it is the intended recipient of a free space optical control and/or data signal broadcast over the internal network by recognizing its respective identifying characteristics.

47. The method of claim 45, wherein the identifying-characteristic(s) comprise one or more of an identifying wavelength, polarization, time-slots in optical control and/or data signals, header and/or combination thereof.

48. A method for executing a data processing application, comprising:

in a data center unit (DCU),
providing one or more data processing units that are configured to run a part or all of a data processing application; and
providing a transmitter and/or a receiver coupled to the one or more data processing units, the transmitter having a transmitting position and the receiver having a receiving position, wherein the transmitter in its transmitting position is configured to broadcast optical data signals over a plurality of optical communication links extending from the DCU in its transmitting position, and wherein the receiver in its receiving position is configured to receive multiple optical control and/or data signals over a plurality of free space optical communication links leading to the DCU,
wherein the transmitter in its transmitting position is configured to broadcast optical control and/or data signals having unique DCU-identifying characteristics, and
wherein the receiver in its receiving position is configured to identify a sending DCU by a DCU-identifying characteristic of the optical control and/or data signal broadcast from the sending DCU.

49. The method of claim 48, further comprising, providing an optical interface unit configured to connect the DCU to a network of optical communication links including the plurality of optical communication links extending from and leading to the DCU.

50. The method of claim 48, wherein the transmitter in its transmitting position is configured to broadcast a multiplicity of optical control and/or data signals simultaneously and/or sequentially to a plurality of receivers.

51. The method of claim 48, wherein the plurality of data processing units include one or more data processing circuits, and wherein the data processing circuits include one or more electronic modules, boxes, servers, cards, boards, and/or racks or free standing assemblies thereof.

* * * * *

UNITED STATES PATENT AND TRADEMARK OFFICE
CERTIFICATE OF CORRECTION

| | |
|---|---|
| PATENT NO. | : 8,483,568 B2 |
| APPLICATION NO. | : 12/800665 |
| DATED | : July 9, 2013 |
| INVENTOR(S) | : Davidson et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this
Twenty-eighth Day of January, 2014

Michelle K. Lee
*Deputy Director of the United States Patent and Trademark Office*